US007450268B2

(12) United States Patent
Martinez et al.

(10) Patent No.: US 7,450,268 B2
(45) Date of Patent: Nov. 11, 2008

(54) IMAGE REPRODUCTION

(75) Inventors: Oscar Martinez, Castelldefels (ES); Steven John Simske, Fort Collins, CO (US); Jordi Arnabat Benedicto, Tarragona (ES); Ramon Vega, Sabadell (ES)

(73) Assignee: Hewlett-Packard Development Company, L.P., Houston, TX (US)

( * ) Notice: Subject to any disclaimer, the term of this patent is extended or adjusted under 35 U.S.C. 154(b) by 772 days.

(21) Appl. No.: 10/884,516

(22) Filed: Jul. 2, 2004

(65) Prior Publication Data

US 2006/0001690 A1 Jan. 5, 2006

(51) Int. Cl.

| | |
|---|---|
| ***H04N 1/387*** | (2006.01) |
| ***H04N 1/409*** | (2006.01) |
| ***H04N 1/50*** | (2006.01) |
| ***H04N 1/58*** | (2006.01) |
| ***G06T 5/00*** | (2006.01) |

(52) U.S. Cl. ........................ 358/1.9; 358/2.1; 358/2.99; 358/3.27; 358/530; 382/176; 382/162; 382/266; 382/286; 382/290

(58) Field of Classification Search .................. 358/1.9, 358/2.1, 3.24, 3.27, 1.11, 1.2, 1.18, 529, 358/530, 532, 538, 453, 462, 2.99; 382/173, 382/176, 254, 266, 282, 286, 289–292, 295–299
See application file for complete search history.

(56) References Cited

U.S. PATENT DOCUMENTS

| | | | | |
|---|---|---|---|---|
| 4,893,257 | A * | 1/1990 | Dominguez et al. | 358/1.11 |
| 5,767,978 | A | 6/1998 | Revankar et al. | |
| 5,956,468 | A * | 9/1999 | Ancin | 358/1.9 |
| 6,169,607 | B1 * | 1/2001 | Harrington | 358/1.9 |
| 6,266,439 | B1 | 7/2001 | Pollard et al. | |
| 6,275,304 | B1 * | 8/2001 | Eschbach et al. | 358/1.9 |
| 7,012,619 | B2 * | 3/2006 | Iwata et al. | 345/613 |

* cited by examiner

*Primary Examiner*—Scott A Rogers

(57) ABSTRACT

A method of reproducing an image, comprising:
creating a, or using an already existing, bitmap-input image;
finding zones in the input image containing text;
determining colors of pixels, characters, or larger text items in the text zones;
reproducing the image, wherein pixels, characters or larger text items with a color near to a primary color are reproduced in the primary color.

25 Claims, 17 Drawing Sheets

(413 TRANSFORMING PIXELS)

(413 TAGGING PIXELS
1=PRIMARY COLOR / BLACK,
0= WHITE)

IMAGE REPRODUCTION

FIELD OF THE INVENTION

The present invention relates generally to methods and devices to reproduce an image, e.g. printing devices.

BACKGROUND OF THE INVENTION

Current techniques of manifolding and reproducing graphical representations of information, such as text and pictures (generally called "images") involve digital-image-data processing. For example, a computer-controlled printing device or a computer display prints or displays digital image data. The image data may either be produced in digital form, or may be converted from a representation on conventional graphic media, such as paper or film, into digital image data, for example by means of a scanning device. Recent copiers are combined scanners and printers, which first scan paper-based images, convert them into digital image representations, and print the intermediate digital image representation on paper.

Typically, images to be reproduced may contain different image types, such as text and pictures. It has been recognized that the image quality of the reproduced image may be improved by a way of processing that is specific to text or pictures. For example, text typically contains more sharp contrasts than pictorial images, so that an increase in resolution may improve the image quality of text more than that of pictures.

U.S. Pat. No. 5,767,978 describes an image segmentation system able to identify different image zones ("image classes"), for example text zones, picture zones and graphic zones. Text zones are identified by determining and analyzing a ratio of strong and weak edges in a considered region in the input image. The different image zones are then processed in different ways.

U.S. Pat. No. 6,266,439 B1 describes an image processing apparatus and method in which the image is classified into text and non-text areas, wherein a text area is one containing black or nearly black text on a white or slightly colored background. The color of pixels representing black-text components in the black-text regions is then converted or "snapped" to full black in order to enhance the text data.

SUMMARY OF THE INVENTION

A first aspect of the invention is directed to a method of reproducing an image by an ink-jet printing device. The method comprises: creating a, or using an already existing, bitmap-input image; finding zones in the input image containing text; determining (i) colors of pixels, characters, or larger text items in the text zones, (ii) sizes of the characters or larger text items, (iii) a main orientation of the text in the input image; and printing the image, wherein (i) pixels, characters or larger text items with a color near to a basic color are reproduced in black or the primary color, (ii) smaller text is reproduced with a higher spatial resolution than larger text, (iii) the image is printed in a print direction transverse to a main reading direction of the text, based on the main text orientation determined.

According to another aspect, a method is provided of reproducing an image. The method comprises: creating a, or using an already existing, bitmap-input image; finding zones in the input image containing text; determining colors of pixels, characters, or larger text items in the text zones; reproducing the image, wherein pixels, characters or larger text items with a color near to a primary color are reproduced in the primary color.

According to another aspect, a method is provided of reproducing an image. The method comprises: creating a, or using an already existing, bitmap-input image; finding zones in the input image containing text; determining colors of characters or larger text items in the text zones by recognizing characters by optical character recognition and averaging the colors of pixels associated with recognized characters or larger text items; reproducing the image, wherein the characters or larger text items, when the average color of a character or larger text item is near to a basic color, are reproduced in the basic color.

According to another aspect, a method is provided of reproducing an image. The method comprises: creating a, or using an already existing, bitmap-input image; finding zones in the input image containing text; determining sizes of the characters or larger text items in the text zones; reproducing the image, wherein smaller text is reproduced with a higher spatial resolution than larger text.

According to another aspect, a method is provided of reproducing an image by an ink-jet printing device. The method comprises: creating a, or using an already existing, bitmap-input image; finding zones in the input image containing text; determining a main orientation of the text in the zones found in the input image; printing the image in a print direction transverse to a main reading direction of the text, based on the main text orientation determined.

According to another aspect, an ink-jet printing device is provided. It comprises a text finder arranged to find text zones in a bitmap-input image; a color determiner arranged to determine colors of pixels, characters, or larger text items in the text zones; a size determiner arranged to determine the size of the characters or larger text items; and an orientation determiner arranged to determine a main orientation of the text in the input image. The printing device is arranged to print the image such that (i) pixels, characters or larger text items with a color near to a basic color are reproduced in the basic color, (ii) smaller text is reproduced with a higher spatial resolution than larger text, (iii) the image is printed in a print direction transverse to a main reading direction of the text, based on the main text orientation determined.

According to another aspect, an image-reproduction device is provided. It comprises a text finder arranged to find text-zones in a bitmap-input image; and a color determiner arranged to determine colors of pixels, characters, or larger text items in the text zones. The image-reproduction device is arranged to reproduce the image such that pixels, characters or larger text items with a color near to a primary color are reproduced in the primary color.

According to another aspect, an image-reproduction device is provided. It comprises a text finder arranged to find text zones in a bitmap-input image; and a color determiner arranged to determine colors of pixels, characters, or larger text items in the text zones by optical character recognition and average the colors of pixels associated with recognized characters or larger text items. The image-reproduction device is arranged to reproduce the image such that the characters or larger text items, when the average color of a character or larger text item is near to a basic color, in the basic color.

According to another aspect, an image-reproduction device is provided. It comprises a text finder arranged to find text zones in a bitmap-input image; and a size determiner arranged to determine sizes of the characters or larger text items in the text zones. The image-reproduction device is arranged to print the image such that smaller text is reproduced with a higher spatial resolution than larger text.

According to another aspect, an ink-jet printing device is provided. It comprises a text finder arranged to find text zones in a bitmap-input image; and an orientation determiner arranged to determine a main orientation of the text in the input image. The printing device is arranged to print the image in a print direction transverse to a main reading direction of the text, based on the main text orientation determined.

Other features are inherent in the methods and products disclosed or will become apparent to those skilled in the art from the following detailed description of embodiments and its accompanying drawings.

DESCRIPTION OF THE DRAWINGS

Embodiments of the invention will now be described, by way of example, and with reference to the accompanying drawings, in which:

FIGS. 4*a*-*b* show representations of an exemplary character at the different stages of the color-snapping procedure, wherein FIG. 4*a* illustrates an embodiment using color transformation, and FIG. 4*b* illustrates an embodiment using color tagging;

DESCRIPTION OF THE PREFERRED EMBODIMENTS

Figure 1:
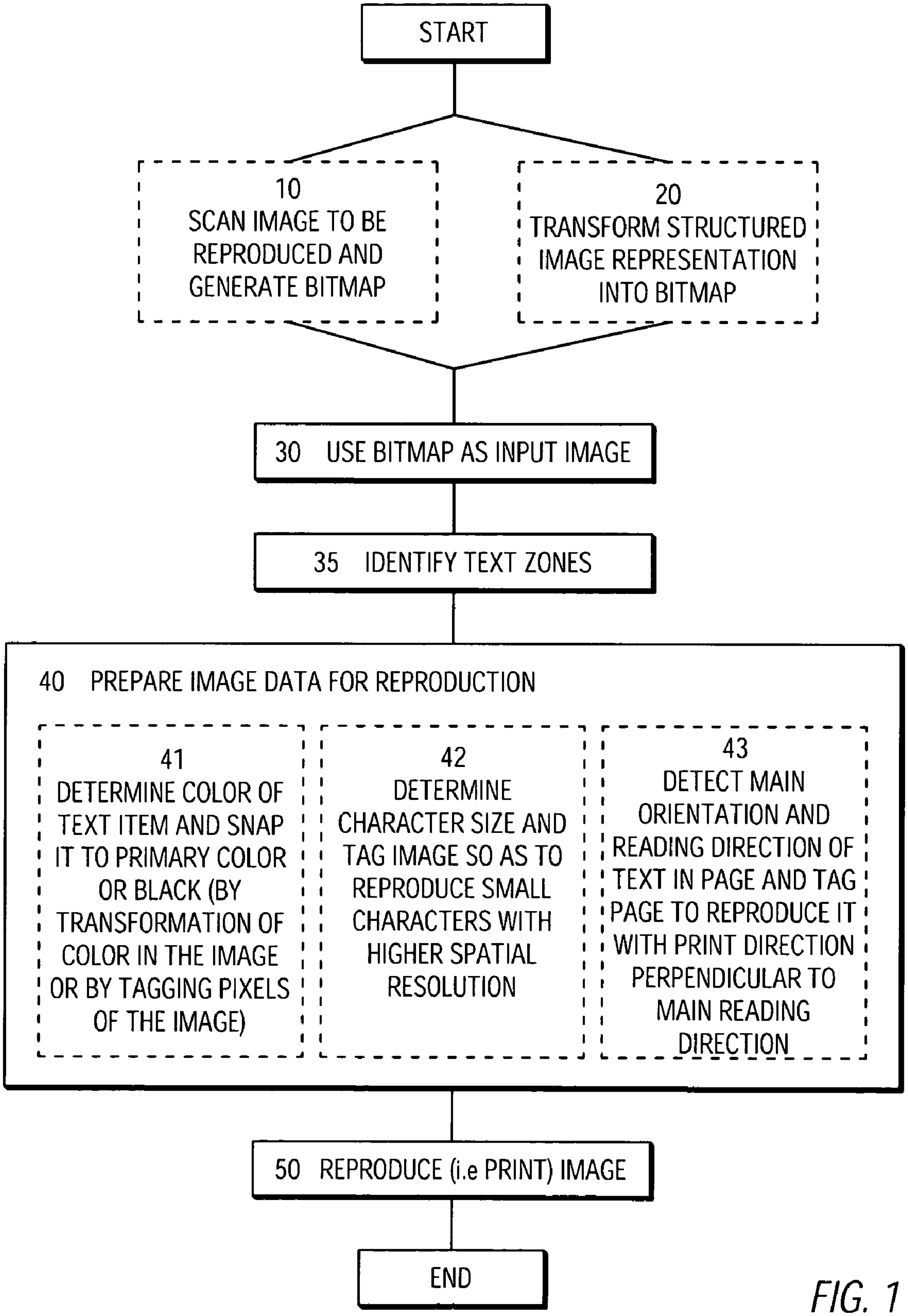
FIG. 1 is a flow diagram illustrating the generation and preparation of image data for reproduction, using three different measures to improve image quality.

FIG. 1 is a flow diagram illustrating the generation and preparation of image data for reproduction. Before proceeding further with the detailed description of FIG. 1, however, a few items of the embodiments will be discussed.

In some of the embodiments, digital image data representing the image to be reproduced is obtained by scanning or capturing a physical image. Scanning may be done e.g. by a scanner, and capturing, e.g. by a video camera. A captured image may also be a frame extracted from moving images, such as video images. A physical image, e.g. a paper document, may be scanned and digitized by a scanning device, which generates an unstructured digital representation, a "bitmap", by transforming content information of the physical image into digital data. The physical image is discretized into small areas called "picture elements" or "pixels". The number of pixels per inch ("ppi") in the horizontal and vertical directions is used as a measure of the spatial resolution. Resolution is generally expressed by two numbers, horizontal ppi and vertical ppi; in the symmetric case, when both numbers are equal, one number is only used. For scanners, frequently used resolutions are 150, 300 and 600 ppi, and in the case of printing, 300, 600 and 1200 dpi are common numbers (in the case of printing, the smallest printable unit is a "dot"; thus, rather than ppi, the unit "dpi" (dots per inch) is often used).

The color and brightness of the paper area belonging to one pixel is averaged, digitized and stored. It forms, together with the digitized color and brightness data of all other pixels, the digital bitmap data of the image to be reproduced. In the embodiments the range of colors that can be represented (called "color space") is built up by special colors called "primary colors". The color and brightness information of each pixel is then often expressed by a set of different channels, wherein each channel only represents the brightness information of the respective primary color. Colors different from primary colors are represented by a composition of more than one primary color. In some embodiments which use a cathode ray tube or a liquid crystal display for reproduction, a color space composed of the primary colors red, green and blue ("RGB color space") may be used, wherein the range of brightness of each primary color, for example, extends from a value of "0" (0% color=dark) to a value of "255" (100% color=bright). In some systems, such as Macintosh® platforms, this ordering may be reversed. In the example above, with values from 0 to 255, one primary color in one pixel can be represented by 8 bits and the full color information in one pixel can be represented by 24 bits. In other embodiments, the number of bits used to represent the range of a color can be different from 8. For example, nowadays scanner devices can provide 10, 12 and even more bits per color. The bit depth (number of bits) depends on the capability of the hardware to discretize the color signal without introducing noise. The composition of all three primary colors in full brightness (in the 8 bit example: 255, 255, 255) produces "white", whereas (0, 0, 0) produces "black", which is the reason for the RGB color space being called an "additive" color space. In other embodiments, which use a printing device, such as an ink-jet printer or laser printer, a "subtractive" color space is generally used for reproduction, often composed of the primary colors cyan, magenta and yellow. The range of each channel, for example, may again extend from "0" (0% color=white) to "255" (100% color=full color), able to be represented by 8 bits (as mentioned above, more than 8 bits may be used to represent one color), but unlike the RGB color system the absence of all three primary colors (0, 0, 0) produces white (actually it gives the color of the substrate or media on which the image is going to be printed, but often this substrate is “white”, i.e. there is no light absorption by the media), whereas the highest value of all primary colors (255, 255, 255) produces black (as mentioned above, the representation may be different on different platforms). However, due to technical reasons the combination of all three primary colors may not lead to full black, but a dark gray near to black. For this reason black (“Key”) may be used as an additional color, the resulting color space is then called “CMYK color space”. With four colors, such as CMYK, each represented by 8 bits, the complete color and brightness information of one pixel is represented by 32 bits (as mentioned above, more than 8 bits per color, i.e. more than 32 bits may be used). Transformations between color spaces are generally possible, but may result in color inaccuracies and, depending on the primary colors used, may not be available for all colors which can be represented in the initial color space. Often, printers which reproduce images using CMY or CMYK inks are only arranged to receive RGB input images, and are therefore sometimes called “RGB printers”. However, when colors and color spaces are discussed herein in connection with color snapping and color reproduction, the colors and color spaces referred are the ones actually used in a reproduction device for the reproduction, rather than input colors (e.g., they are CMYK in a printer with CMYK inks).

Since, in a CMYK color space, black plays a particular role and is not a regular primary color, such as red, green, blue, or cyan, magenta, yellow, it is often not subsumed to the “primary colors”. Therefore, the term “primary color” herein refers to one of the regular primary colors, such as red, green, blue, or cyan, magenta, yellow. The more generic term “basic color” is used herein to refer to:

- black alone, for example, if black is the only color, as in white-black reproduction; or
- one of the primary colors and black, for example, if black is used in addition to primary colors, as in the CMYK color space; or
- one of the primary colors (without black), for example, if black is not used in addition to primary colors, as in the RGB color space.

In some of the embodiments, the bitmap input data is not obtained by scanning or capturing a physical image, but by transforming an already existing digital representation. This representation may be a structured one, e.g. a vector-graphic representation, such as DXF, CDR, MPGL, an unstructured (bitmap) representation, or a hybrid representation, such as CGM, WMF, PDF, POSTSCRIPT. Creating the bitmap-input image may include transforming structured representations into bitmap. Alternatively, or additionally, it may also include transforming an existing bitmap representation (e.g. an RGB representation) into another color representation (e.g. CMYK) used in the graphical processing described below. Other transformations may involve decreasing the spatial or color resolution, changing the file format or the like.

Figure 3:
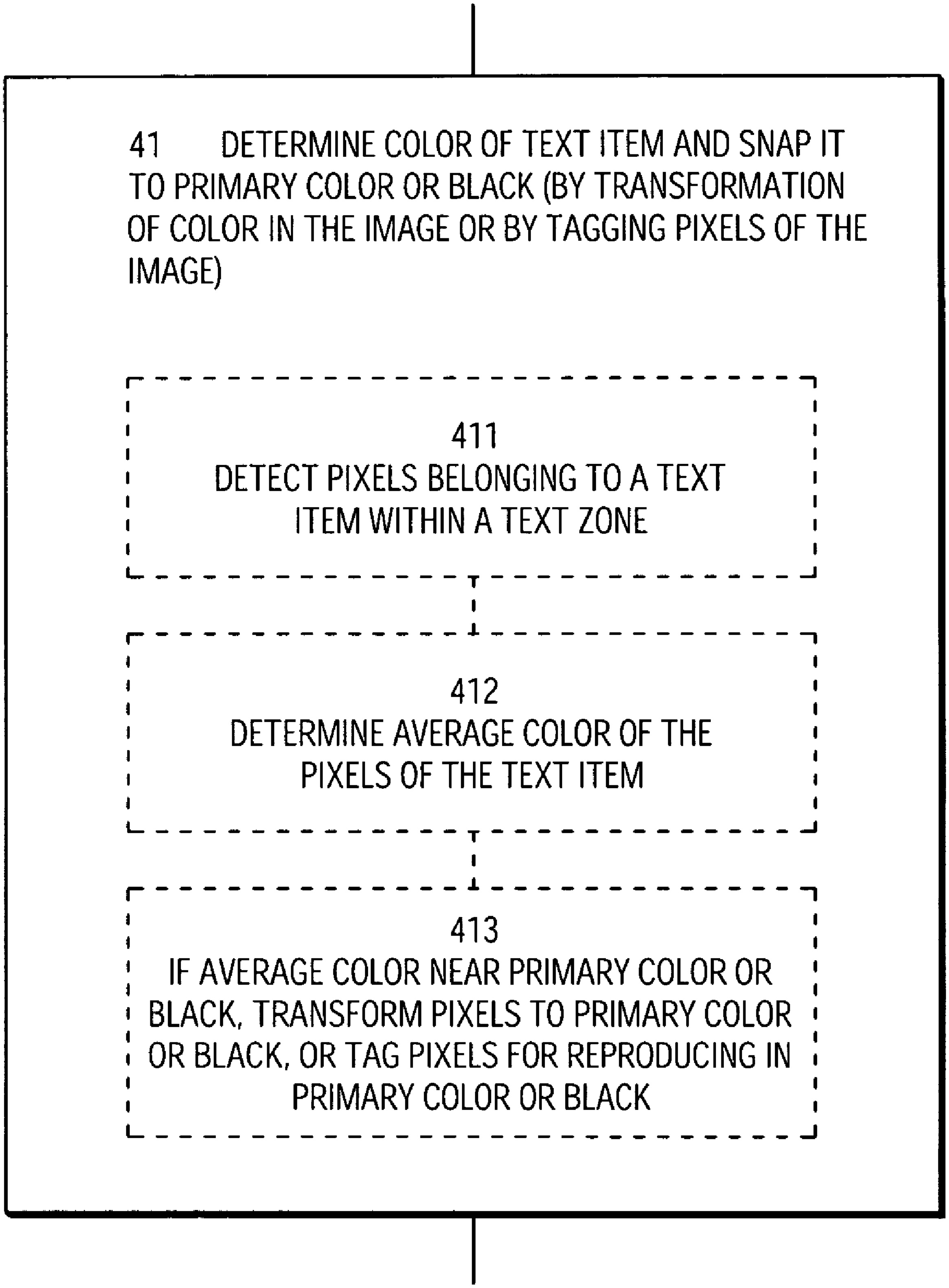
FIG. 3 is a flow diagram illustrating color snapping in more detail.

The obtained bitmap of the image to be reproduced is then analyzed by a zoning analysis engine (i.e. a program performing a zoning analysis) in order to distinguish text zones from non-text zones, or, in other words, to perform a content segregation, or segmentation. As will be explained in more detail below, the text in the text zones found in the zoning analysis is later used in one or more activities to improve the text image quality, such as “color snapping”, use of a font-size-dependent spatial resolution and/or choice of a print direction transverse to a main reading direction. Zoning analysis algorithms are known to the skilled person, for example, from U.S. Pat. No. 5,767,978 mentioned at the outset. For example, a zoning analysis used in some of the embodiments identifies high-contrast regions (“strong edges”), which are typical for text content and low-contrast regions (“weak edges”) typical for continuous-tone zones, such as pictures or graphics. In some embodiments, the zoning analysis calculates the ratio of strong and weak edges within a pixel region; if the ratio is above a predefined threshold, the pixel region is considered as a text region which may be combined with other text regions to form a text zone. Other zoning analyses count the dark pixels or analyze the pattern of dark and bright pixels within a pixel region in order to identify text elements or text lines. The different types of indication for text, such as the indicator based on strong edge recognition and the one based on background recognition, may be combined in the zoning analysis. As a result of the zoning analysis, text zones are found and identified in the bitmap-input image, e.g. as illustrated in FIG. 3 of U.S. Pat. No. 5,767,978. Typically, but not necessarily, the zoning analysis is tuned such that text embedded in pictures is not considered as a text zone, but is rather assigned to the picture in which it is embedded.

In the embodiments, three different measures are applied to improve the image quality of the text reproduced; these measures are: (i) snapping to basic color; (ii) using higher spatial resolution for small text; and (iii) print direction perpendicular to the main reading direction. In some of the embodiments, only one of the measures (i), (ii) or (iii) is used. In other embodiments, pairs of these measures, (i) and (ii), (i) and (iii), or (ii) and (iii) are used. Finally, in some embodiments, the combination of all three measures, (i) and (ii) and (iii), is used.

In the framework of all three measures, optical character recognition (OCR) may be used to identify text items (e.g. characters) within the text zones and identify certain text-item attributes (such as text font, text size, text orientation). In connection with the first measure, “snapping to basic color”, OCR may also be used to determine whether individual pixels in a text zone of the input bitmap, belong to a text item. OCR algorithms able to identify text items and their attributes are well-known in the art. Once a text item has been recognized by OCR, it can be determined which pixels lie inside the recognized text item, and which pixels lie outside; the pixels lying inside the text item are considered as the pixels belonging to the text item (since a pixel is an extended object, it may partly lie on the boundary of a text item; therefore, the decision criterion may be whether the center of a pixel lies inside or outside the text item recognized).

The first measure, “snapping to basic color” is now explained in more detail. As already mentioned above, the terms “color”, “primary color”, “color average”, “color threshold”, etc., used in this context refer to the colors, primary colors, etc., actually used in the reproduction device for the reproduction (e.g., they are CMYK in a printer with CMYK inks), rather than color in input images which may be in a different color representation (e.g. RGB in a CMYK printer accepting RGB input).

First, the meanings of the terms “snapping to basic color” and “snapping to primary color” is discussed. Referring to the above definitions of “basic color” and “primary color”, the term “snapping to basic color” includes:

(a) only snapping to black; if, although primary colors are used (as in CMYK), the primary colors are not included in the color-snapping procedure; or (b) only snapping to black, if black is the only color used, as in white-black reproduction; or (c) snapping to one of the primary colors and black, if black is used in addition to primary colors (as in CMYK), and the primary colors are included in the color-snapping procedure; or (d) snapping to one of the primary colors (without black), if black is not used in addition to primary colors (as in RGB), or if black is used, but is not included in the color-snapping procedure.

In connection with claims 10 and 24, the term "snapping to primary color" is used. This indicates the ability to snap to a primary color, such as red, green, blue, or cyan, magenta, yellow, irrespective of whether there is also a "snapping to black"; it therefore includes the above alternatives (c) and (d), but does not include alternatives (a) and (b).

To perform color snapping, first, the color of a pixel, or the average color of a group of pixels forming a character or a larger text item, such as a word, is determined. A test is then made whether the (average) color is near a basic color, for example by ascertaining whether the (average) color is above a basic-color threshold, e.g. 80% black, 80% cyan, 80% magenta or 80% yellow in a CMYK color space. If this is true for one basic color, the pixel, or the group of pixels, is reproduced in the respective basic color, in other words, it is "snapped" to the basic color. Such a snapping to the basic color improves the image quality of the reproduced text, since saturated colors rather than mixed colors are then used to reproduce the pixel, or group of pixels.

If only one basic color is used (e.g. only black or only one primary color), the above-mentioned threshold test is simple, since only one basic-color threshold has then to be tested. If there are more than one basic colors (e.g. four basic colors in a CMYK system), it may happen that the (average) color tested exceeds two or more of the basic color thresholds (e.g. the color has 85% yellow and 90% magenta). In such a case, in some embodiments, the color is then snapped to the one of the basic colors having the highest color value in the tested color (e.g. to magenta, in the above example). In other embodiments, no color snapping is performed if more than one basic-color threshold is exceeded. The basic-color threshold need not necessarily be a fixed single-color threshold, but may combine color values of all basic colors, since the perception of a color may depend on the color values of all basic colors. Of course, the basic color thresholds may also depend on the kind of reproduction and the reproduction medium.

In embodiments in which the color of pixels of a group of pixels is averaged, and the average color is tested against the basic-color thresholds, first a decision is taken as to which pixels belong to the group, as already mentioned above; in some embodiments, OCR is applied to the text zones, and the pixels belonging, e.g. to the individual characters recognized by OCR, form the "groups of pixel" to be averaged.

In the averaging procedure, in some embodiments, pixels of a group having a color value considerably different from the other pixels of the group (also called "outliers") are not included in the average. For example, if a character is imperfectly represented in the input-image, e.g. if a small part of a black character is missing (which corresponds to a white spot in the case of a white background), the character could nevertheless be correctly recognized by the OCR, but the white pixels (forming the white spot) are excluded from the calculation of the average color. The exclusion of such outliers is, in some embodiments, achieved in a two-stage averaging process in the first stage of which the character's overall-average color is determined using all pixels (including the not-yet-known outliers), and then the colors of the individual pixels are tested against a maximum-distance-from-overall-average threshold; in the subsequent second averaging stage only those pixels are included in the average which have a color distance smaller than this threshold, thereby excluding the outliers. This second color average value is then tested against the basic-color thresholds, as described above, to ascertain whether or not the average color of the pixels of the group is close enough to a basic color to permit their color to be snapped to this basic color. In some of the embodiments, the snapping thresholds mainly test hue, since saturation and intensity will vary along the edges of the characters.

In most of the embodiments, it is not an aim of the color-snapping procedure to improve the shape of text items of the input image, such as imperfect characters, but only to reproduce them as they are in a basic color, if the averaged pixel color is close to the basic color (e.g. with regard to hue, since saturation and intensity may vary along the edges). In other words, if a character is imperfectly represented in the input image, e.g. if a nearly black character has a white spot, the color-snapped reproduced character will have the same imperfect shape (i.e. the same white spot), but the other pixels (originally nearly black) belonging to the character will be reproduced in full black (of course, this is only exemplary, since the "black color" and "white color" can be other background or text hues, dependent on the histogram of the "text and background" areas in a particular case). In some of the embodiments, this is achieved by not modifying the color of outliers; the definition which defines which pixels are outliers may be the same as the one described above in connection with the exclusion of outlier pixels from the averaging procedure, or may be another independent definition (it may, e.g. use another threshold than the above-mentioned maximum-distance-from-overall-average threshold).

However, in some of the embodiments, color snapping may be combined with a "repair functionality" according to which all pixels of a character—including outliers, such as white spots—are set to a basic color, if the average color of the character (including or excluding the outliers) is close to the basic color. In such embodiments, not only the color, but also the shape or the characters to be reproduced is modified.

There are different alternative ways in which color snapping is actually achieved in the "reproduction pipeline" (or "printing pipeline", if the image is printed). For example, the printing pipeline starts by creating, or receiving, the bitmap-input image, and ends by actually printing the output image.

In some of the embodiments, the original color values in the bitmap-input image of the pixels concerned are replaced (i.e. over-written) by other color values representing the basic color to which the original color of the pixels is snapped. In other words, the original bitmap-input image is replaced by a (partially) modified bitmap-input image. This modified bitmap-input image is then processed through the reproduction pipeline and reproduced (e.g. printed) in a usual manner.

In other embodiments, rather than replacing the original bitmap-input image by its color-snapped version, the original image data is retained unchanged and the snapping information is added to the bitmap-input image. The added data is also called a "tag", and the process of adding data to a bitmap image is called "tagging". Each pixel of the bitmap-input image may be tagged, for example, by providing one additional bit per pixel. A bit value of "1", e.g. may stand for "to be snapped to basic color" and a bit value of "0" may stand for "not to be snapped", in the case of only one basic color. More than one additional bit may be necessary if more than one basic color is used (e.g. 0="not to be snapped", 1="to be snapped to black", 2="to be snapped to first primary color", 3="to be snapped to second primary color", etc.); this is also called palette or lookup-table (LUT) snapping. In embodiments using tagging the actual "snapping to basic color" is then performed at a later stage in the reproduction pipeline, for example, when the bitmap-input image is transformed, using a color map, into a print map which represents the amounts of ink of different colors applied to the individual pixels (or dots).

The second measure to improve the image quality of text (measure (ii)) is to reproduce smaller text (e.g. characters of a smaller font size) with a higher spatial resolution than larger text (e.g. characters of a larger font). Generally, the number of different reproducible colors (i.e. the color resolution) and the spatial resolution are complementary quantities: If, on the one hand, the maximum possible spatial resolution is chosen in a given reproduction device (e.g. an ink-jet printer), no halftoning is possible so that only a small number of colors can be reproduced (or, analogously, in white-black reproduction, only white or black, but no gray tones can be reproduced). On the other hand, if a lower spatial resolution is chosen, a larger number of colors (in white-black reproduction: a number of gray tones) may be reproduced, e.g. by using halftone masks.

Generally, there are different spatial resolutions in a printing device: (i) printing resolution, (ii) pixel size, and (ii) halftoning resolution.

- the printing resolution is given by the number of dots that can be reproduced in a certain distance; for example, in an ink-jet printer it is given by the number of drops that can be fired in a certain distance. The printing resolution can be relatively high, 4800 dpi, for instance;
- the pixel size is the size of the discretized cells used in the data representation of the image to be printed; it can be relatively small; for instance, the pixel size may be equal to dot size, allowing a 4800 ppi resolution in the example above;
- the halftoning resolution corresponds to the size of the halftoning window, or cell. A halftoning window normally includes a plurality of pixels to allow mixing of colors. For example, the halftoning window can extend over 32, 64, 128, 256, etc. pixels. The bigger the halftoning window, the bigger are the possibilities of mixing colors, i.e. the better is the color resolution, and the smaller is number of lines per inch that can be reproduced, i.e. the smaller the effective spatial resolution. The halftoning resolution defines the spatial resolution of the reproduced image. Thus, color resolution and spatial resolution are complementary.

It has been recognized that an improved perceived text image quality can be achieved by using a better color resolution in larger text fonts and a better spatial resolution in smaller text fonts. Therefore, according to measure (ii), the sizes of characters or larger text items (such as words) in the text zones are determined, and smaller text is then reproduced (e.g. printed) with a higher spatial resolution than larger text.

In some of the embodiments, the determination of the characters or larger text items is based on OCR; typically, OCR not only recognizes character, but also provides the font sizes of recognized characters.

The reproduction of characters and smaller text items with higher spatial resolution is, in some of the embodiments, achieved by using a higher-resolution print mask for smaller text. "Higher-resolution print mask", of course, does not necessarily mean the above-mentioned extreme case of an absence of halftoning; it rather means that the size of the halftoning window is smaller than in a lower-resolution print mask, but if the window size is not yet at the minimum value (which corresponds to the pixel size), there may still be some (i.e. a reduced amount of) halftoning. In some embodiments, if both smaller and larger characters are found in a text zone, a sort of hybrid print mask is used in which regions forming higher-resolution print masks (i.e. regions with bigger halftoning windows) are combined with regions forming lower-resolution print masks (i.e. regions with smaller halftoning windows).

In some of the embodiments, the printing resolution can be changed "on the fly", i.e. during a print job. In such embodiments, the trade-off between image quality and throughput may be improved by choosing a smaller printing resolution when small fonts are to be printed, rather than a smaller halftoning window. For in a typical scanning printer, more passes have to be made to increase paper axis resolution, or in a page-wide-array system the advance speed is lowered, when a smaller printing resolution is used. Some embodiments can print both at low and high print resolution grids; in these embodiments, a higher-print-resolution grid is used in regions with small text items (resulting in a higher number of passes in a scanning printing system, or a lower advance speed in a page-wide array system), but printing with a lower-print-resolution grid is resumed in regions without small text items (resulting in a smaller number of passes in a scanning printing system, or a higher advance speed in a page-wide array system). As a result, throughput is increased, while good image quality is maintained.

Normally, reproducing smaller text with higher spatial resolution requires the input-image information to be available with a sufficiently high spatial resolution. However, it is not necessary for this information to be a priori available. Rather, in some embodiments, the bitmap-input image is, at a first stage, only created (e.g. scanned) with a smaller spatial resolution. If it then turns out, after text-zone finding and OCR have been performed, that a higher-resolution input bitmap is required due to the presence of small-font text, another scan of the image to be reproduced is performed, now with the required higher spatial resolution.

Typically, print masks are not used at the beginning of the printing pipeline to modify the bitmap-input image, but rather later in the pipeline, when the print map representing the amounts of ink to be applied to pixels (or dots) is generated. Therefore, in some of the embodiments, the bitmap-input image is not modified in connection with the different spatial resolutions with which it is to be reproduced, but it is tagged. In other words, data is added to the bitmap-input image indicating which regions of the image are to be reproduced with which resolutions. The regions may, e.g. be characterized by specifying boundaries of them, or by tagging all pixels within a region with a value representing the respective spatial resolution.

The third measure to improve the image quality of text (measure (iii)) is to choose the print direction transverse (perpendicular) to the main human-reading direction. This measure is useful when an ink-jet printer is used, for example The print direction is the relative direction between the ink-jet print head and the media (e.g. paper) onto which the ink is applied; in the case of a swath printer with a reciprocating print head it is typically transverse to the media-advance direction, but in the case of a page-width printer it is typically parallel to the media-advance direction.

It has been recognized that most users prefer or find value in printing perpendicular to the reading direction because:

(i) the vertical lines of most letters (which are, on average, longer and more straight than the horizontal lines) mask typical ink-jet defects and artifacts due to spray, misdirected ink drops, etc. For example, if the spray provoked by ink-drops tails fall on, or under, a fully inked area; the artifact tails are not visible; this will happen more frequently with a print direction perpendicular to the reading direction (in other words, the "visible drops tails vs. character type or size ratio" is smaller with a print direction perpendicular to the reading direction);

(ii) the human reader pays less attention to the vertical direction of a document (perpendicular to the reading direction) than to the horizontal direction. Defects in the document's vertical direction are normally less annoying for human readers. Besides, if the ink-drops tails are so "long" that they merge among characters, this would affect a lot the reading clarity of a text. Since, in the vertical direction, the space between characters (the line space) is bigger than in the horizontal direction, this merging effect is lower in the vertical direction. Thus, the reading clarity is not so much affected due to the merging effect with a "vertical" print direction, i.e. the print direction perpendicular to the reading direction.

Thus, the human reader is less sensitive to character-reproduction defects at those parts of the characters which are transverse to the reading direction than those which are parallel to it. For example, if a "T" is considered, a defect at the vertical edge of the T's vertical bar would be less annoying than a defect at the horizontal edge of the T's horizontal bar. Accordingly, the perceived image quality of text can be improved by choosing the printing direction perpendicular to the reading direction.

Since a whole page is normally printed using the same print direction, a compromise is made when a page contains text with mixed orientations, e.g. vertically and horizontally oriented characters (wherein "vertical character-orientation" refers to the orientation in which a character is normally viewed, and "horizontal character-orientation" is rotated by 90° to it). In the Roman, and many other alphabets, the reading direction is transverse to the character orientation, i.e. it is horizontal for vertically-oriented characters and vertical for horizontally-oriented characters. Then, the main reading direction of the text on this page is determined, e.g. by counting the numbers of horizontally and vertically-oriented characters in the text zones of the page and considering the reading direction of the majority of the characters as the "main reading direction". Other criteria, such as text size, font, etc. may also be used to determine the main reading direction. For example, a different weight may be given to characters of different fonts, since the sensitivity to these defects may be font-dependent; e.g., a sans-serif, blockish font like Arial will produce a greater sensitivity to these defects than a serif, flowing font such as Monotype Corsiva. Consequently, a greater weight may be assigned to Arial characters than Monotype Corsiva characters, when the characters with horizontal and vertical orientations are counted and the main reading direction is determined. The orientation of the characters can be determined by OCR. The print direction is then chosen perpendicular to the main reading direction.

The main reading direction may vary from page to page since, for example, one page may bear a majority of vertically oriented characters, and another page a majority of horizontally oriented characters. In the embodiments, each page of the bitmap-input image is tagged with the one-bit tag indicating whether the main reading direction of this page is horizontal or vertical. This reading-direction tag is then used in the printing pipeline to assure that the main reading direction is chosen perpendicular to the print direction. In most printers, the print direction is determined by the structure of the print heads and the paper-advance mechanism, and cannot be changed. Therefore, the desired relative orientation between the main reading direction of the image to be printed and the print direction can be achieved by virtually rotating the bitmap-input image or the print map representing the amounts of ink to be printed. If the reading-direction tag for a certain page indicates that the orientation of the main reading direction of the bitmap-input image data is transverse to the print direction, no such virtual rotation is performed. By contrast, if the reading-direction tag indicates that the main reading direction of the image data is parallel to the print direction, a 90° rotation of the image data is performed. The subsequently printed page therefore has the desired orientation.

Of course, the print media is provided in such a manner that both orientations can alternatively be printed. In some of the embodiments, the format of the print media used (e.g. paper) is large enough to accommodate both portrait and landscape orientation (for example, a DIN A4 image may alternatively be printed on a DIN A3 paper sheet in portrait or landscape format, as required). In other embodiments, the image size may correspond to the print media size (e.g. DIN A4 image size and DIN A4 print-media size), and the printing device has at least two different paper trays, one equipped with paper in the portrait orientation, the other one in the landscape orientation. In these embodiments, the printing device is arranged to automatically supply a portrait-oriented paper sheet if the page is printed in portrait orientation, and a landscape-oriented paper sheet if it is printed in landscape orientation. Thus, the reading-direction tag not only controls whether the image data are virtually rotated by 90°, but also whether portrait-oriented or landscape-oriented paper is used for printing the tagged page.

Generally, there is a trade-off between image quality (IQ) and throughput (mainly print speed). Depending on the printing system, such as page-wide-array printing systems, scanning-printing systems, etc., the page orientation influences the print speed. For instance, in a page-wide-array system, landscape orientation could typically be printed faster than portrait, for instance. In some embodiments, the printing device enables the final user to select a "fast print mode" (without using the automatic selection of a transverse print direction, described above, but always using a high-throughput direction, such as landscape) or a "high IQ print mode" (with such an automatic choice).

In some of the embodiments, further measures are applied to improve the image quality of reproduced text: in the text zones found, halftone methods, print masks, resolutions and/or edge treatments may be applied which are different from those used in the picture zones or other non-text zones. Furthermore, text may be underprinted with color to increase the optical density (needing then less number of print passes to achieve the same perceived optical density). In order to achieve such a different treatment of text and picture, pixels or regions of pixels associated with text in text zones found are tagged such that the tagging indicates that the text-particular halftone methods, resolutions, linearization methods, edge treatments and/or text underprintings are to be applied to the tagged pixels or regions of pixels.

The third measure to improve the image quality of text (choosing print direction transverse to main reading direction) is an ink-jet-specific measure; it will therefore be used in connection with ink-jet printing, and the embodiments of reproducing devices implementing the third measure are ink-jet printing devices. The first measure (snapping to black and/or primary color) and the second measure to improve image quality (reproducing smaller text with a higher spatial resolution than larger text) are not only useful for ink-jet printing, but also for other printing technologies, such as electrostatic-laser printing and liquid electrophotographic printing, and, furthermore, for any kind of color reproduction, including displaying the image in a volatile manner on a display, e.g. on a liquid-crystal display or a cathode-ray tube. The three measures may be implemented in the reproduction device itself, i.e. in an ink-jet printing device, a laser printing device or a computer display, or in an image recording system, such as a scanner (or in a combined image recording and reproducing device, such as a copier). Alternatively, the methods may be implemented as a computer program hosted in a multi-purpose computer which is used to transform or tag bitmap images in the manner described above.

Returning now to FIG. 1, it shows a flow diagram illustrating the process of generating and preparing image data for reproduction using three different measures to improve image quality. If no digital-data representation of the original image is available, the original image, e.g. a sheet of paper with the image printed on it is scanned, and a digital bitmap representation of it is generated at 10. Alternatively, if a structured digital-data representation of the image to be reproduced is available, e.g. a vector-graphics image, it is transformed into a bitmap representation at 20. In the bitmap obtained, the image is rasterized in a limited palette of pixels, wherein the color of each pixel is typically represented by three or four color values of the color space used, e.g. the RGB or CMYK values. In still further cases, a bitmap representation of the image to be reproduced may already be available, but the available representation may not be appropriate; e.g. the colors may be represented in a color space not used here; rather than generating a bitmap or transforming structured image data into a bitmap, the existing bitmap representation is then transformed into an appropriate bitmap representation, e.g. by transforming the existing color representation (e.g. RGB) into another color representation (e.g. CMYK).

At 30, the bitmap is used as an input image for further processing. At 35, a zoning analysis is performed on the bitmap-input image to identify text zones, e.g. as illustrated in FIG. 3 of U.S. Pat. No. 5,767,978. At 40, the input image is prepared for reproduction with improved image quality of text in the text zones. As a first measure, at 41, the color of text items, e.g. characters is determined and snapped to one of the primary colors and black, if the original color of the character is near to the primary color or black. The snapping to primary color or black may either be effected by transforming the color of the pixels belonging to the character in the bitmap-input image, or by tagging the respective pixels of the image. As a second measure, at 42, the sizes of the characters in the text zones are determined, and the bit regions representing small characters are tagged so that the small characters are reproduced with a higher spatial resolution. As a third measure, at 43, the main orientation of the text in the page considered is detected, and the main reading direction is concluded from it. The page is then tagged so that it is reproduced with the print direction perpendicular to the main reading direction. Finally, at 50, the image is printed with the snapped colors, higher spatial resolution for small characters and a print direction perpendicular to the main reading direction.

Figure 2:
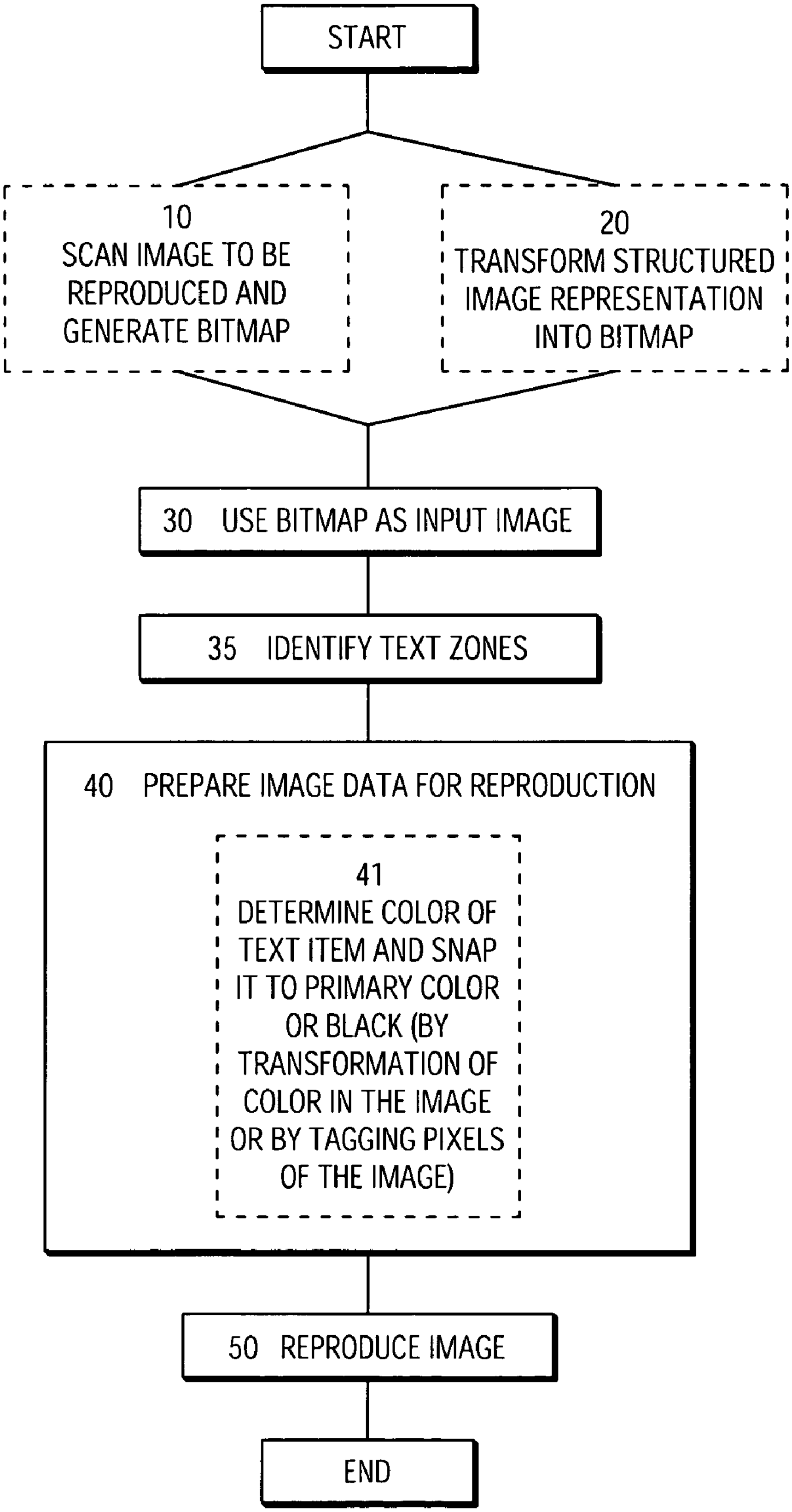
FIG. 2 is a flow diagram similar to FIG. 1 illustrating an embodiment in which one of the measures is used, namely color snapping.
Figure 7:
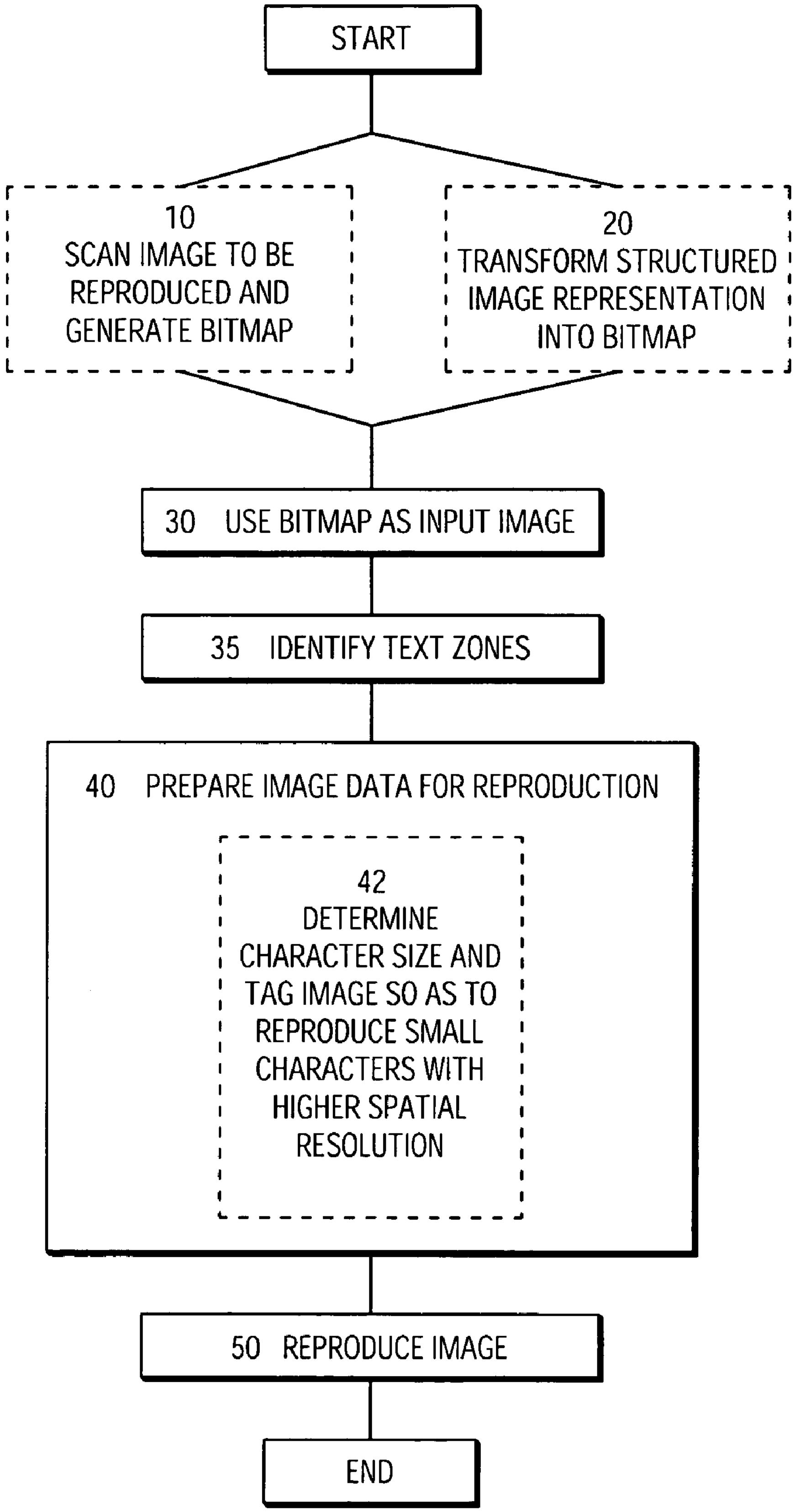
FIG. 7 is a flow diagram similar to FIG. 1 illustrating an embodiment in which another of the measures to improve the image quality is used, namely reproducing small characters with higher spatial resolution.
Figure 10:
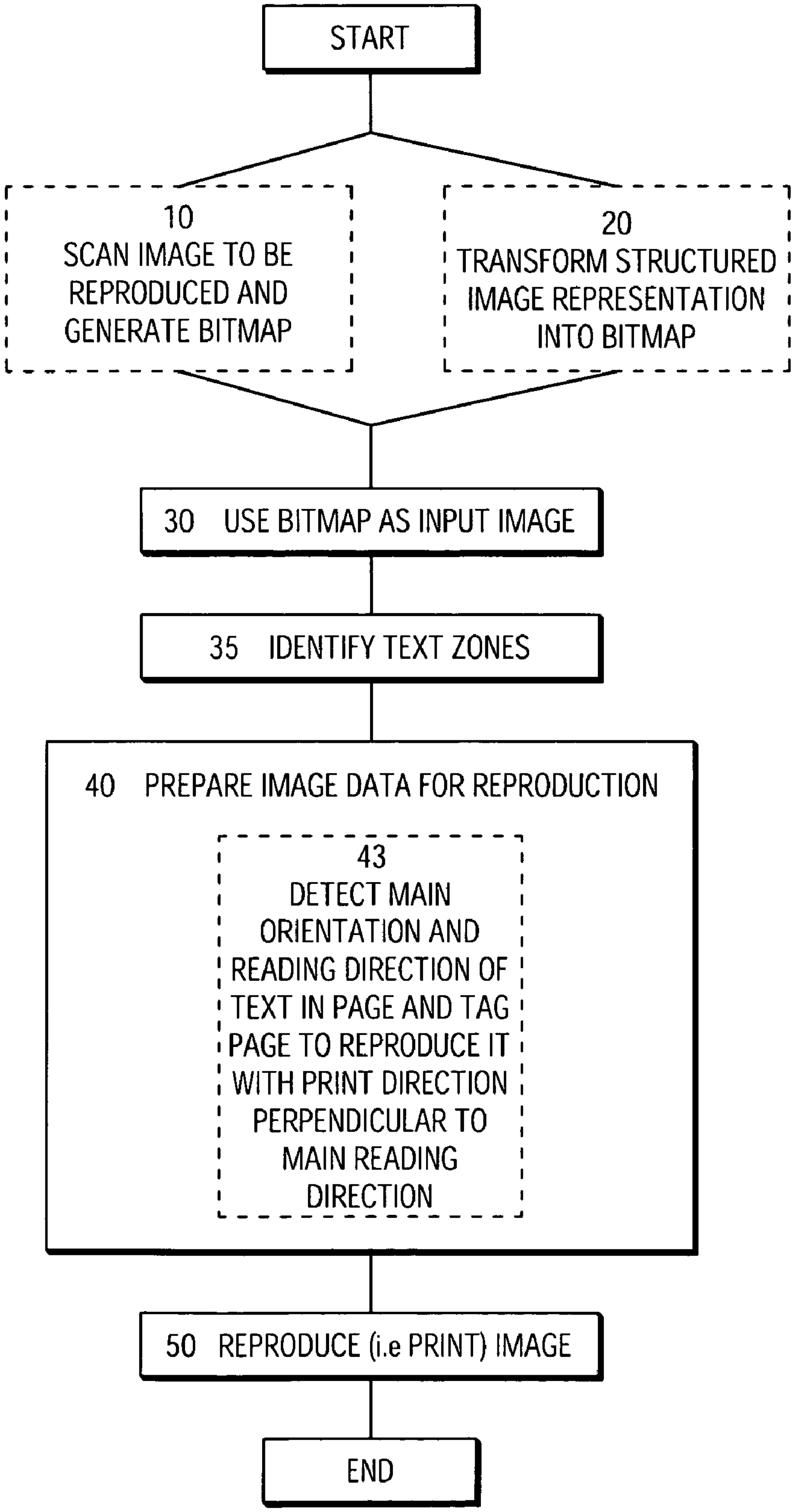
FIG. 10 is a flow diagram similar to FIG. 1 illustrating an embodiment in which yet another of the measures to improve the image quality is used, namely choosing the print direction perpendicular to the main reading direction.

Whereas FIG. 1 shows the three measures to improve image quality 41, 42 and 43 in combination, FIGS. 2, 7 and 10 illustrate other embodiments in which only one of the measures 41, 42 or 43 is used. There are still further embodiments which combine measures 41 and 42, 41 and 43 and 42 and 43, respectively. The remaining figures illustrate features of the measures 41, 42, 43, and therefore refer both to the "combined embodiment" of FIG. 1 and the "non-combined embodiments of FIGS. 2, 7 and 10.

FIG. 2 is a flow diagram similar to FIG. 1 illustrating an embodiment in which only one of the measures of FIG. 1 is performed, namely measure 41, "snapping to primary color or black". Therefore, measures 42 and 43 are not present in FIG. 2. Since color snapping to primary color or black is not only useful in printing, but also when images are reproduced on video screens, etc., reproducing the image at 50 does not refer specifically to printing. Apart from these differences, the embodiment of FIG. 2 corresponds to FIG. 1.

FIG. 3 is a flow diagram illustrating the color-snapping procedure (box 41 of FIGS. 1 and 2) in more detail for an individual text item in a text zone. First, at 411, those pixels are detected which belong to the text item (e.g. character) considered. This detection may be based on OCR (FIG. 5) or on a different method; for example, a cluster-detection method which considers a cluster of similarly colored pixels as a "text item". Then, at 412, the average color of the text item's pixels is determined (the average may, for example, the mean, or the median, depending on the print technology and application). As described above, in some of the embodiments pixels having a color far away from the text item's average color are not included in the averaging procedure and, therefore, do not influence the average determined at 412 (as described, this can be achieved by a two-stage averaging procedure, in the first stage of which the pixels with a color far away from the average color are determined and excluded, and in the second stage of which the final color average, not using those pixels, is determined). At 413, it is ascertained whether the text item's average color is near a primary color or black. If this is true, the pixels belonging to the text item are transformed to the primary color or black, or are tagged so that they are reproduced in the primary color or black later in the reproduction pipeline. As explained above, in some of the embodiments those of the text item's pixels having a color far away from the text item's color average are not snapped to the primary color or black, in order not to change the text item's shape, but rather limit the effect of the color-snapping procedure to an improvement of the text item's color reproduction.

Figure 4A:
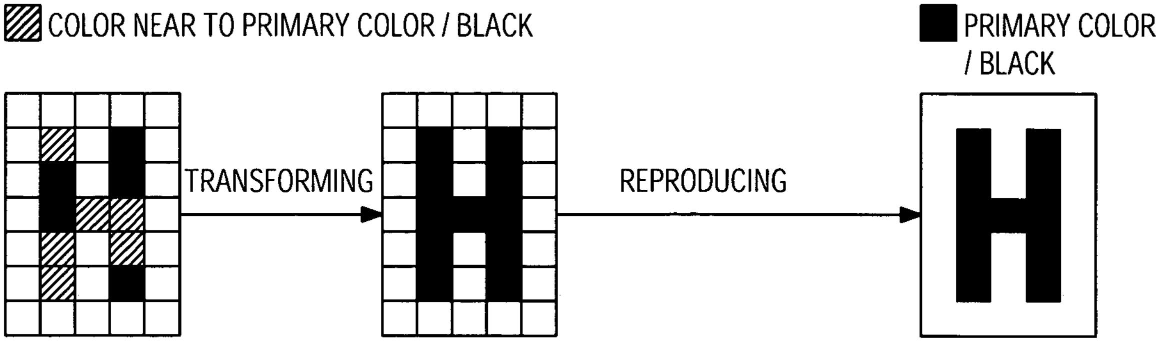
Figure 4B:
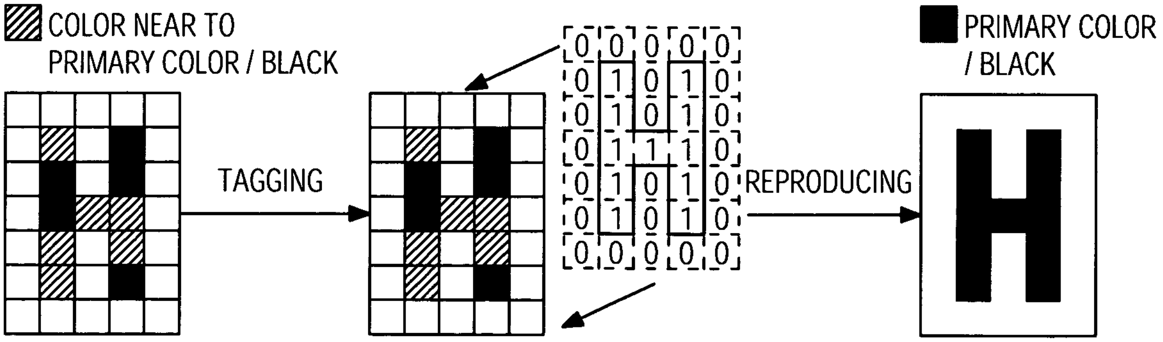

FIGS. 4*a* and 4*b* show representations of an exemplary character, an "H", at the different stages of the color-snapping procedure, wherein FIG. 4*a* illustrates an embodiment using color transformation, and FIG. 4*b* illustrates an embodiment using color tagging. A cutout with the original bitmap-representation of the character considered is shown at the left-hand side of FIGS. 4*a* and 4*b*. Pixels to which the color "white" is assigned, are reproduced in white, pixels in a primary color (e.g. magenta) or black are shown in black, and pixels which have a color near to the primary color (e.g. magenta) or black are hatched. As can be seen, some of the character's pixels in the original bitmap-representation are in the primary color, or black, whereas others are near to the primary color, or black. This may, for example, be a scanning artifact: Assume that, in an original paper document, the character considered here was printed in a primary color (e.g. magenta) or black. Typically, at some of the pixels, the scanner did not recognize the primary color, or black, but rather recognized a slightly different color near to the primary color, or black.

During the averaging procedure described above, it is then determined that the average color of the character considered is near to the primary color (e.g. magenta) or black. In the embodiment according to FIG. 4*a*, the pixels belonging to the character are then transformed in the original bitmap-representation to the primary color (e.g. magenta), or black. This is illustrated by the bitmap representation shown in the middle of FIG. 4*a*. In other words, the original bitmap-input image is replaced by a modified one. Then, the character is reproduced, e.g. printed or displayed, according to the modified bitmap-representation, as illustrated at the right-hand side of FIG. 4*a*.

According to another embodiment illustrated by FIG. 4*b*, the character's original bitmap-representation is not replaced by a modified one, but rather the original representation is tagged by data specifying which pixels are to be reproduced in the primary color (e.g. magenta) or black. In the example shown in FIG. 4*b*, all pixels to be reproduced in the primary color (e.g. magenta), or black, are tagged with a "1", whereas the remaining bits are tagged with a "0". Of course, in other embodiments tags with more than one bit are used to enable snapping to more than one color, e.g. to three primary colors and black, to be tagged. In the example of FIG. 4*b*, also those pixels are tagged with "1" which already in the original bitmap representation are represented in the primary color, or black. This, of course, is redundant and may be omitted in other embodiments.

In the reproduction pipeline, the tags indicate that the tagged pixels are to be printed in the primary color, or black, although the color assigned to the respective pixel in the bitmap representation indicates a different color. Finally, the character is reproduced in the primary color, or black, as shown at the right-hand side of FIG. 4*b*. Although the internal mechanism of "color snapping" is different in FIGS. 4*a* and 4*b*, the reproduced representations are identical.

Figure 5:
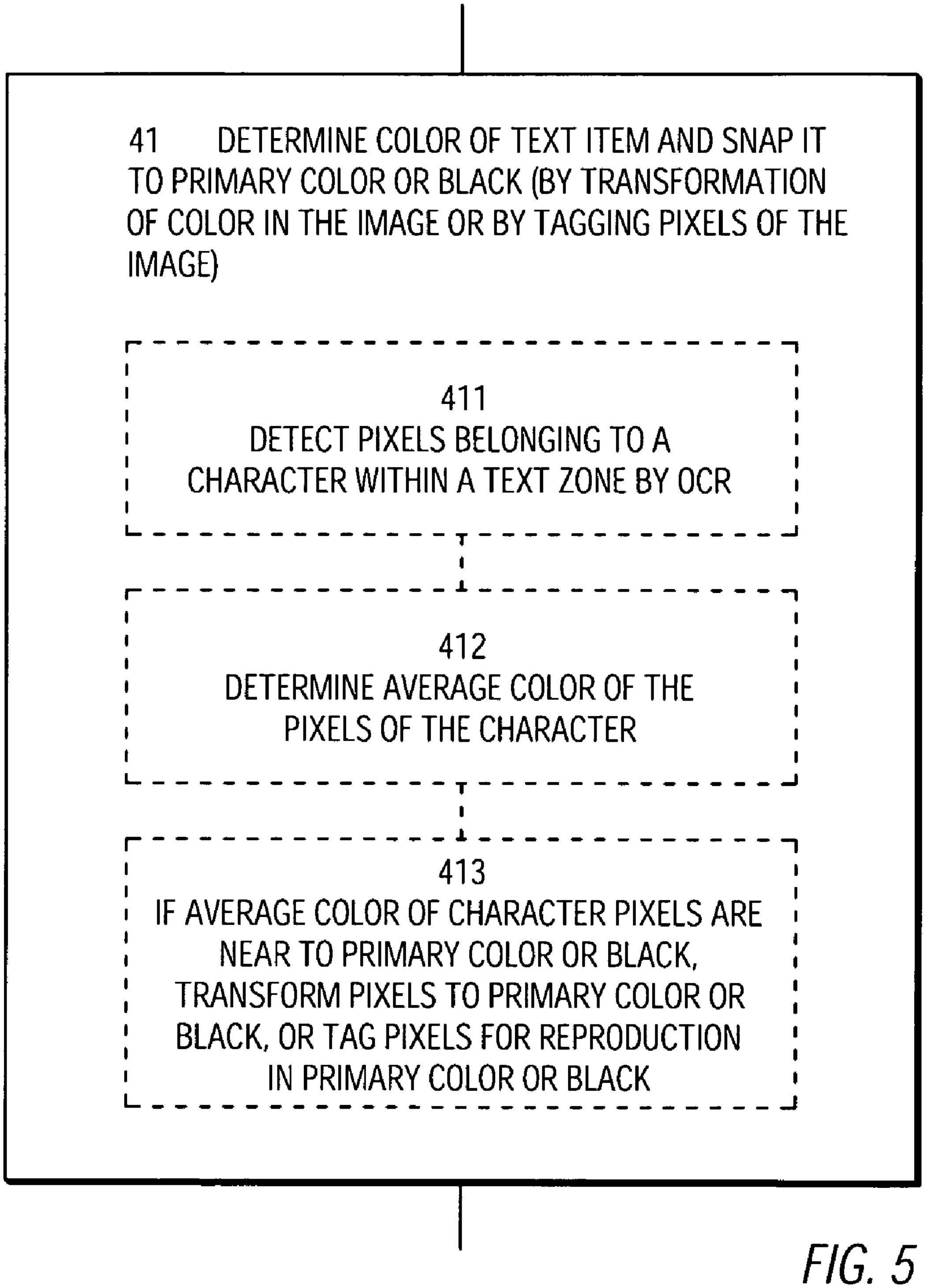
FIG. 5 is a flow diagram as FIG. 3, but including the text-item recognition based on OCR.

FIG. 5 is a flow diagram similar to FIG. 3, but is more specific in showing that the detection of pixels belonging to a text item is performed using optical character recognition (OCR). The recognized text items are therefore characters. In principle, OCR recognizes characters by comparing patterns of pixels with expected pixel patterns for the different characters in different fonts, sizes, etc., and assigns that character to the pixel pattern observed whose expected pixel pattern comes closest to the pixel pattern observed. As a by-product, OCR is able to indicate which pixels belong to the character recognized, and which pixels are part of the background.

Figure 6D:
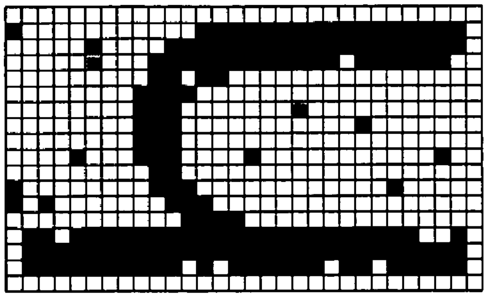
FIGS. 6*a*-*d* illustrate an embodiment of the color-snapping procedure based on OCR.
Figure 6C:
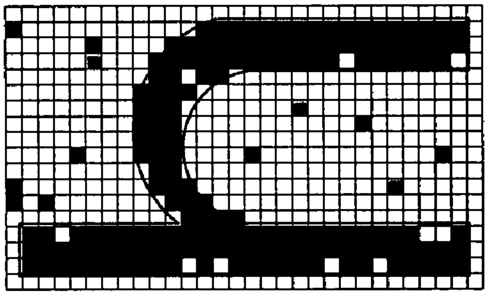
Figure 6B:
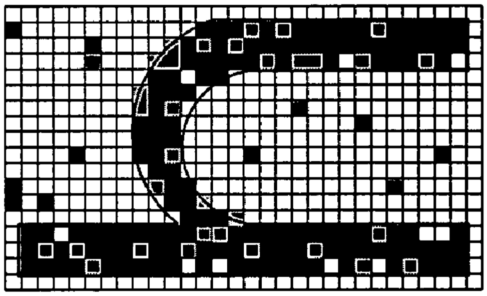
Figure 6A:
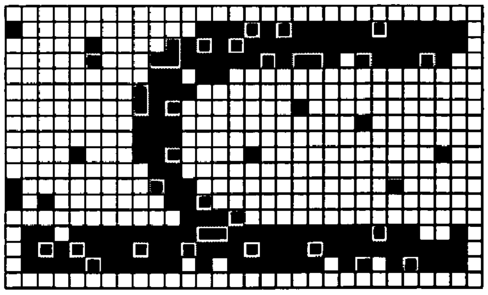

FIGS. 6*a* to 6*d* illustrate an OCR-based embodiment of the color-snapping procedure in more detail. Similar to the example of FIG. 4, a cut-out of a bitmap-input image is shown in FIG. 6*a*, now carrying a representation of the character "h". Unlike FIG. 4, the "h" not only has primary-color pixels (or black pixels) and near-primary color pixels (or near-black pixels), but also has some white spots. Furthermore, there is some colored background, i.e. some isolated colored pixels around the character "h" (those background pixels may have a primary color, or black, or any other color).

After having applied OCR to this exemplary bitmap, it is assumed that the OCR has recognized the character "h". In the subsequent FIG. 6*b*, the bitmap-representation has not been changed, but only the contour of the recognized "h" has been overlaid with the recognized character's contour. This illustrates that the process has awareness of which pixels belong to the character recognized, and which ones do not. As can be seen, due to the discrete character of the bitmap and the size of the individual pixels, some of the pixels at the character's contour are partially within the character's contour and, to some extent, outside it. A pixel may not be considered as a pixel belonging to the character, if, for instance, its center is located outside the character's contour.

In the subsequent color-averaging procedure all pixels belonging to the recognized character, according to the above definition, are included, except those pixels having a color far away from the average. In other words, the white spots are not included. Provided that the color average determined in this manner is near to a primary color (e.g. magenta), or black, the color of the pixels belonging to the character recognized is then snapped to the primary color (e.g. magenta), or black, except those pixels which initially had a color far away from the average color, i.e. except the white spots.

The result is illustrated in FIG. 6*c*, still together with the contour of the character recognized: Originally primary-color pixels (or black pixels) belonging to the character remain primary-color pixels (or black pixels); originally near-primary-color pixels (or near-black pixels) belonging to the character are snapped to the respective primary color (or black); pixels with a color far from a primary color (or far from black) belonging to the character remain unchanged; and pixels which do not belong to the character remain unchanged, too.

Finally, FIG. 6*d* shows the character without the character's contour, i.e. it shows the character as it is reproduced, for example printed on a print media. As can be seen, neither the shape of the character nor the background has been modified, but only the character's color representation has been improved. A reason for not modifying the character's shape and the background is robustness against OCR errors: If, for example, a cluster of colored pixels in the input-bitmap image is similar to two different characters, and the OCR recognizes the "wrong" one, this error will only influence the color of the reproduced cluster, but not its shape, thereby leaving a chance for the human reader to perceive the correct character.

FIG. 7 is a flow diagram similar to FIGS. 1 and 2 illustrating an embodiment in which only another of the measures of FIG. 1 is performed, namely measure 42, "reproducing small characters with higher spatial resolution". Therefore, the measures 41 and 43 are not present in FIG. 7. Since reproducing small characters with higher spatial resolution is not only useful in printing, but also when images are reproduced on video screens, etc., reproducing the image at 50 does not refer specifically to printing. Apart from these differences, the embodiment of FIG. 7 corresponds to FIG. 1.

Figure 8:
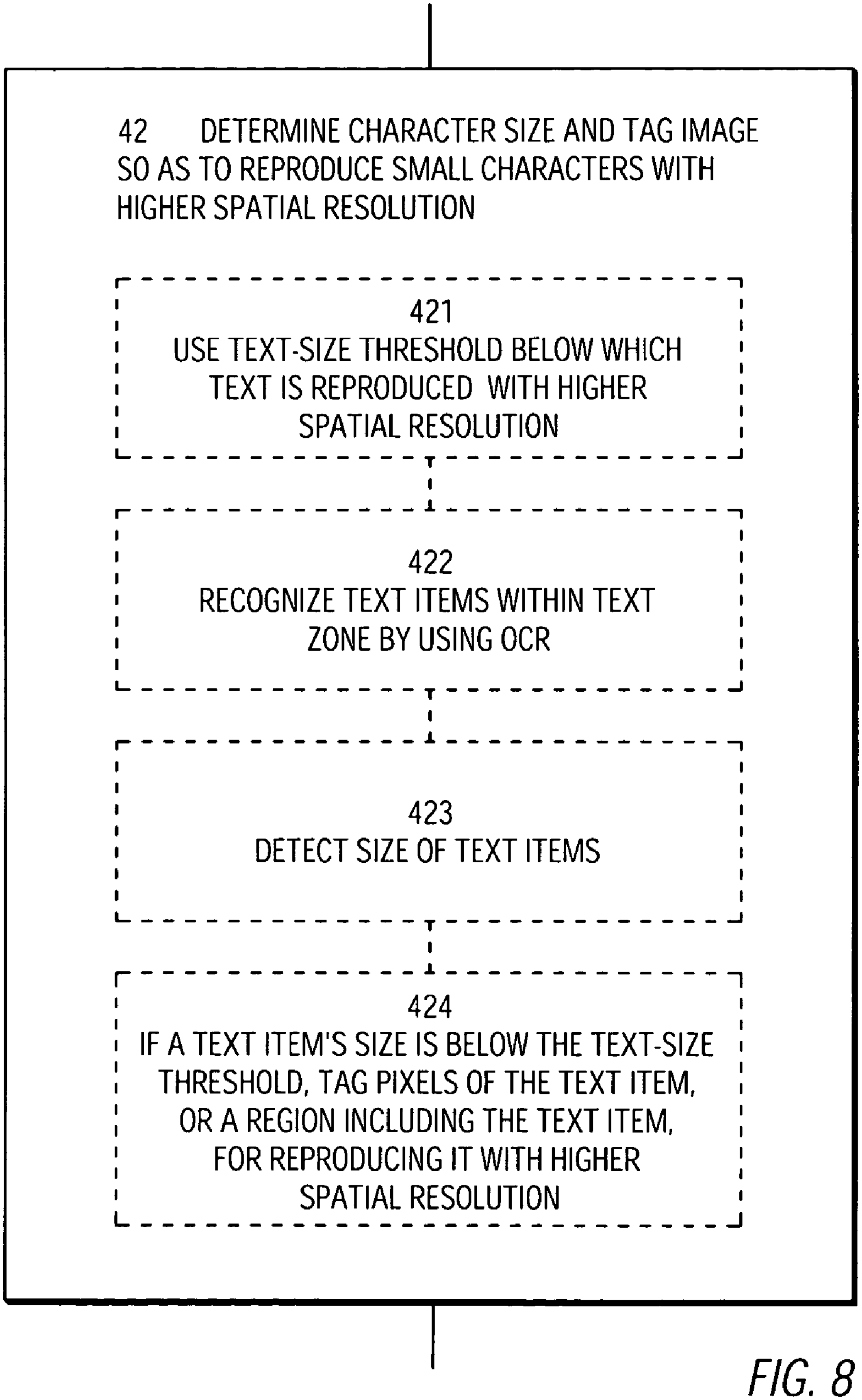
FIG. 8 is a flow diagram which illustrates the reproduction of small characters with higher spatial resolution in more detail.

FIG. 8 is a flow diagram which illustrates the procedure of reproducing small characters with higher spatial resolution (box 42 of FIGS. 1 and 7) in more detail. A text-size threshold below which text is reproduced with higher spatial resolution is used, as indicated at 421. For example, the threshold may specify a certain font size, so that all characters with a font size below the threshold are reproduced with a higher spatial resolution than the other, larger characters, which, due to the complementarity between spatial and color resolution, are printed with a higher color resolution. The impact on image quality of the spatial resolution chosen may have significant font dependencies; for instance, Arial will be affected more than Times Roman, etc. Thus, in some embodiments, different font-size threshold specific for different fonts (e.g. Arial and Times Roman) are used. At 422, text items (e.g. characters) within the text zones are recognized by OCR. As a by-product of the OCR, the size of the text items (e.g. the font size of characters) is detected, as indicated at 423. If the text item's size is below the text-size threshold, the pixels of the text item, or a pixel region including the text item, are, or is, tagged at 423, so that it can be reproduced with a higher spatial resolution than the spatial resolution used for larger text items above the threshold. Incidentally, such a distinction by text size may decrease throughput; thus, in some embodiments, it is only made when selected by the final user, if throughput demands warrant such a distinction by text size.

Figure 9:
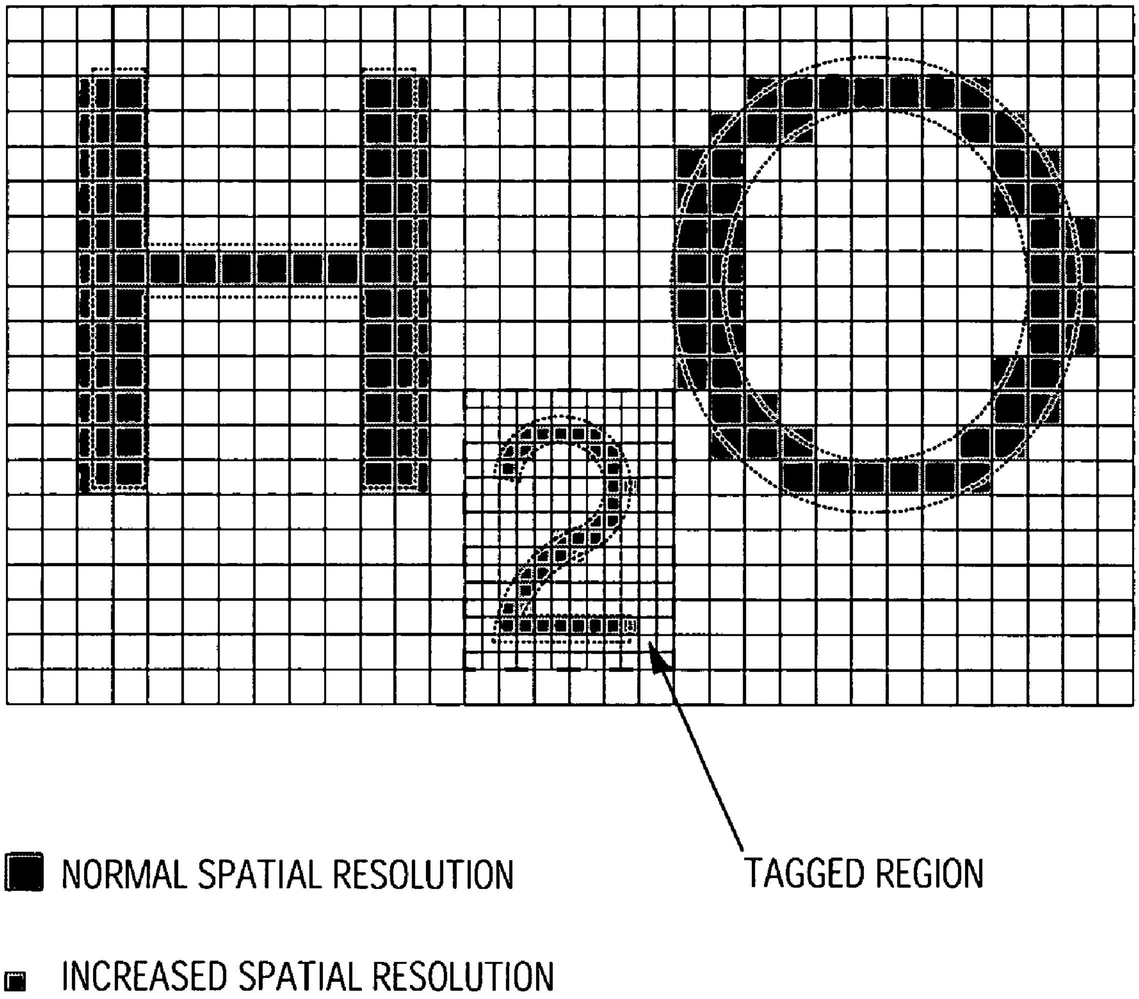
FIG. 9 shows an exemplary representation of characters with different sizes reproduced with different spatial resolutions.

FIG. 9 illustrates what results are achieved when characters having different sizes, here the characters "$H_2O$", are reproduced with different spatial resolutions. By applying OCR to the bitmap-input image, the characters "H", "2" and "O" are recognized (box 422 of FIG. 8). As a by-product of the OCR, the font sizes of these characters are also detected; in the example shown in FIG. 9 the font size of "2" is only about half of the font size of "H" and "O" (box 423 in FIG. 8). Assuming that the smaller font size is below the threshold (box 421 of FIG. 8), a region including the "2" in the bitmap-input image is then tagged to indicate that this region is to be reproduced with a higher spatial resolution than the other regions. As a consequence, in some of the embodiments (e.g. embodiments which always use the highest printing resolution), at the end of the reproduction pipeline a print mask is chosen for the tagged region which has a smaller halftoning window, whereas the other regions are reproduced using a print mask with a larger halftoning window. For example, the smaller halftoning-window size corresponds to a resolution of 600 ppi, whereas the larger halftoning-window size corresponds to a resolution of 300 ppi. FIG. 9 shows a grid with the different halftoning-window sizes, the characters "$H_2O$" as they are actually printed, and contour lines indicating how these characters would appear when reproduced with a perfect spatial resolution. As can be seen in FIG. 9, due to the discrete nature of the halftoning-window, the shapes of the characters actually printed differ from the ideal shapes; as can further be seen, this difference, in absolute terms, is smaller for the smaller character "2" than for the larger characters "H" and "O". On the other hand, since the larger halftoning-window provide a higher color resolution, the colors of the larger characters "H" and "O" can generally be reproduced with a better quality than the color of the smaller character "2".

In other embodiments, the printing resolution can be changed "on the fly", i.e. during a print job. In such embodiments, the trade-off between image quality and throughput may be improved by choosing a smaller printing resolution when small fonts are to be printed, rather than a smaller halftoning window. For in a typical scanning printer, more passes have to be made to increase paper axis resolution, or in a page-wide array system the advance speed is lowered, when a smaller printing resolution is used. Some embodiments can print both at low and high print resolution grids; in these embodiments, a higher-print-resolution grid is used in regions with small text items (resulting in a higher number of passes in a scanning printing system, or a lower advance speed in a page-wide array system), but printing with a lower-print-resolution grid is resumed in regions without small text items (resulting in a smaller number of passes in a scanning printing system, or a higher advance speed in a page-wide array system). As a result, throughput is increased, while good image quality is maintained.

FIG. 10 is a flow diagram similar to FIGS. 1, 2 and 7 illustrating an embodiment in which the third of the measures of FIG. 1 is performed without the others, namely measure 43, "choosing the print direction perpendicular to the main reading direction". Apart from the fact that the other measures 41 and 42 are not present in FIG. 10, it corresponds to FIG. 1.

Figure 11:
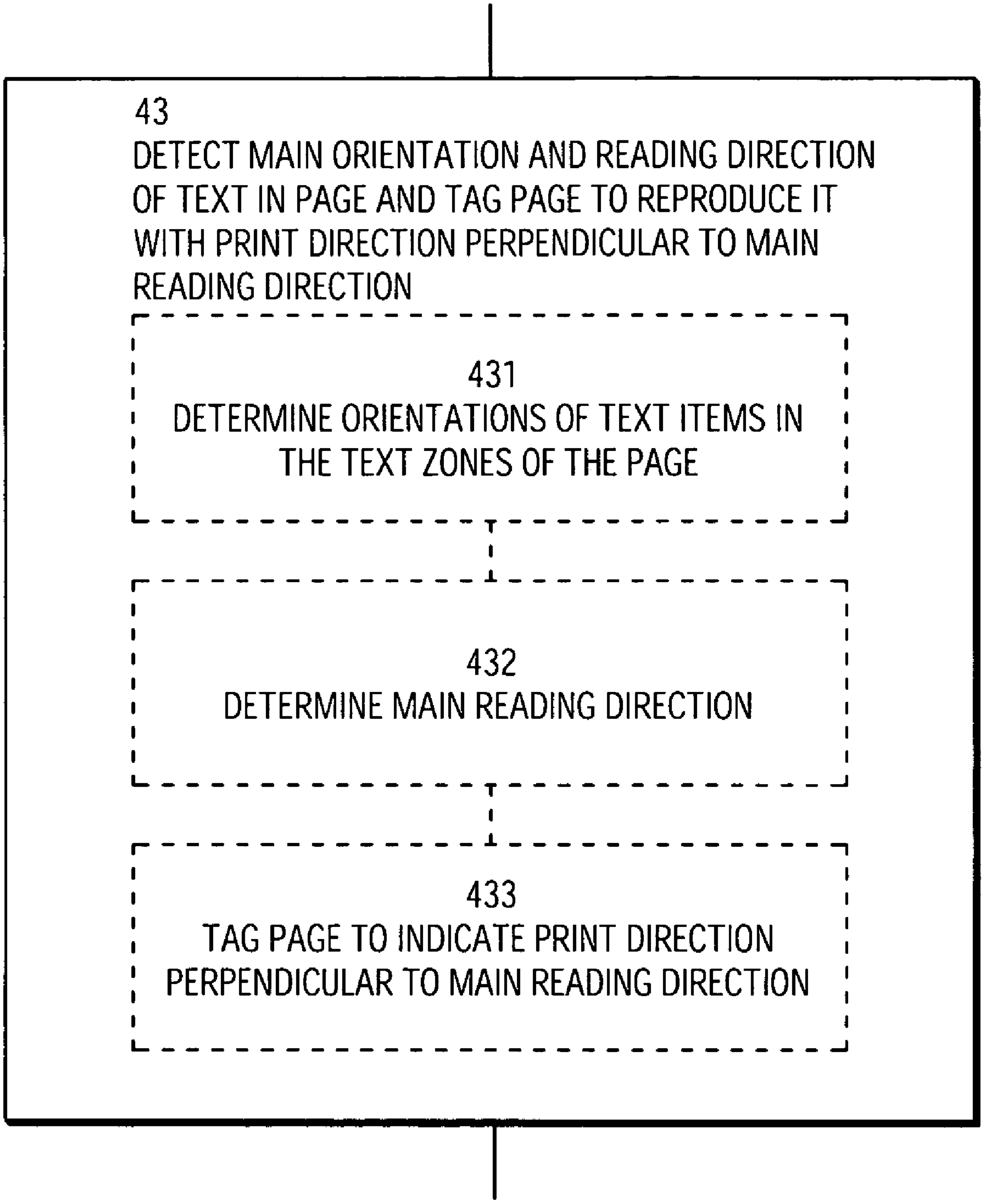
FIG. 11 is a flow diagram which illustrates printing perpendicularly to the main reading direction in more detail.

FIG. 11 is a flow diagram which illustrates the procedure of choosing the print direction perpendicular to the main reading direction (box 42 of FIGS. 1 and 10) in more detail. At 431, the orientations of the text items (e.g. characters) in the text zones of the page considered are determined. For example, this can be achieved by applying OCR to the text, since this provides, as a by-product, the orientations of the characters recognized. At 432, the main reading direction of text in the page considered is determined. For example, the orientation of the majority of characters in the page considered is taken as the main orientation of text. If the reading direction is perpendicular to the character orientation (as is the case in the Roman alphabet), the main reading direction of the text is determined to be perpendicular to the main orientation of the text. For example, in a page in which the majority of characters are vertically oriented, the main text orientation is vertical, and the main reading direction is horizontal. At 433, the page is then tagged to indicate the direction in which it is to be printed. For example, a tag bit "1" may indicate that the virtual image to be printed has to be turned by 90° before it is printed, whereas the tag bit "0" may indicate that the virtual page need not be turned. As already mentioned above, there is a trade-off between image quality (IQ) and throughput. For instance, in a page-wide-array system, landscape orientation could typically be printed faster than portrait, for instance. In some embodiments, the printing device enables the final user to select a "fast print mode" (without using the automatic selection of a transverse print direction, described above, but always using a high-throughput direction, such as landscape) or a "high IQ print mode" (with such an automatic choice).

Figure 12A:
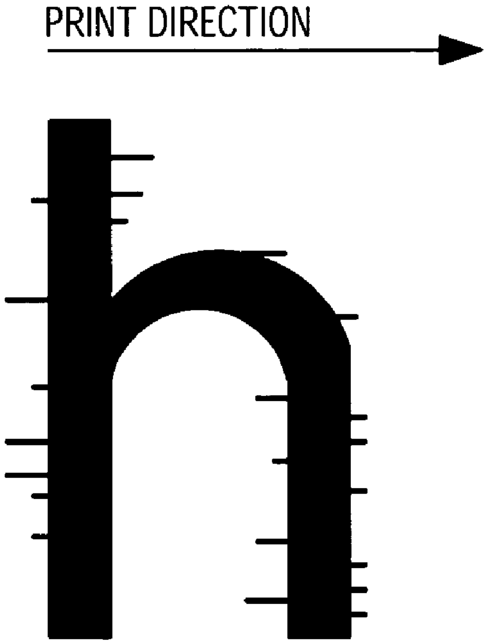
FIGS. 12*a*-*b* illustrate that reproductions of a character may differ when printed in different directions.
Figure 12B:
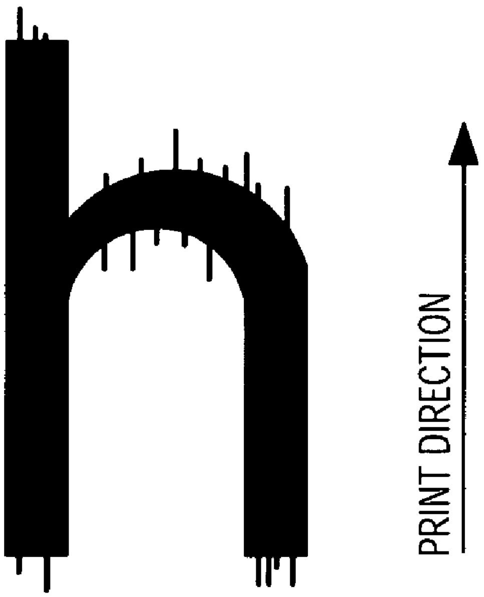

FIG. 12 illustrates what a reproduced character may look like when printed parallel (FIG. 12*a*) and perpendicular (FIG. 12*b*) to the main reading direction. In both cases shown, the orientation of the exemplary character "h" is vertical. Consequently, the reading direction is horizontal. As is drawn in FIG. 12 in an exaggerated manner, the actual reproduction of the character is not perfect, but some ink will inevitably be applied to the white background outside the character's contour. This effect is typically more pronounced in the print direction than transverse to it, as a comparison of FIGS. 12*a* and 12*b* illustrates. The perceived image quality is better in the case of FIG. 12*b*, in which the print direction is perpendicular to the reading direction. By the measure described in connection with FIG. 11, the major part of the text in a page is printed as in FIG. 12*b*, whereby the overall text image quality is improved.

Figure 13:
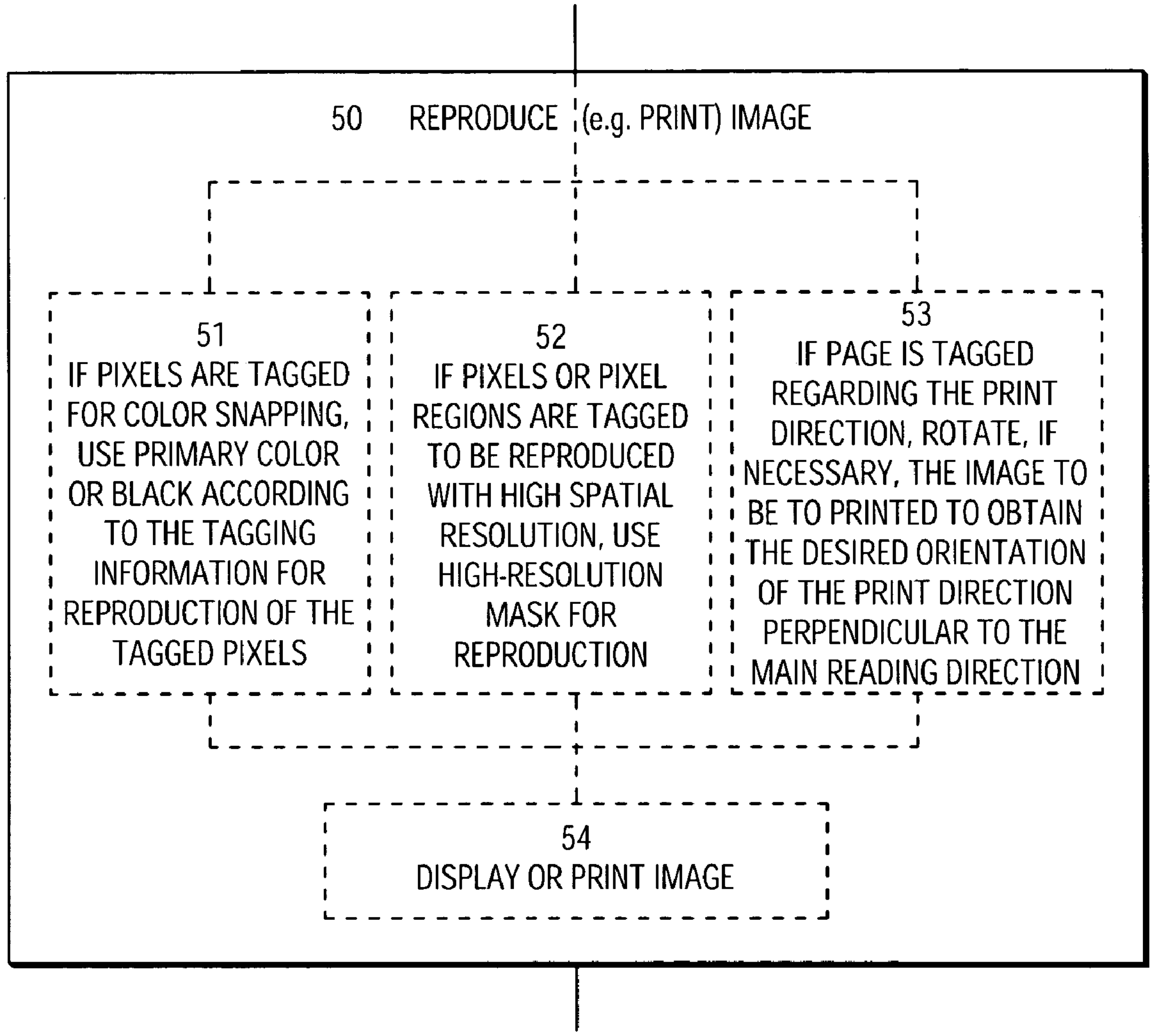
FIG. 13 is a flow diagram illustrating the reproduction of tagged image data.

FIG. 13 illustrates how tagged data are reproduced; in other words, it illustrates box 50 of FIGS. 1, 2, 7 and 10 in more detail. For simplicity, three different activities, 51, 52, 53, pertaining to the treatment of tagged image data are shown in a combined manner in FIG. 13. Of course, FIG. 13 is also intended to illustrate those embodiments in which only the activities 51, 52 or 53, or pairs, such as 51 and 52, 51 and 53 or 52 and 52, are performed.

If an image is to be reproduced, it is ascertained whether tags are assigned to the image which have to be taken into account in the reproduction procedure. At 51, it is ascertained whether pixels of the image or regions of pixels carry color-snapping tags indicating that the respective pixels are to be reproduced in a primary color or black. If such a tag is found, the respective pixel is reproduced in the primary color, or black, indicated by the tag. Thereby, the color of the pixels which is still indicated in the bitmap is effectively "overridden".

At 52, it is ascertained if pixels or pixel regions are tagged to be reproduced with a higher spatial resolution. For the pixels or pixel regions tagged in this manner, a high-resolution mask is used for the subsequent reproduction of the image (or the printer is switched to a higher-printing-resolution grid, if applicable). At 53, it is ascertained whether a page to be printed is tagged with regard to the print direction. If a tag is found indicating that, with the present orientation of the virtual image in memory, the image would not be printed in the desired print direction, the virtual image is rotated so that it is printed with a print direction perpendicular to the main reading direction. Finally, at 54, the image is actually displayed or printed, in the described manner directed by the tags in 51, 52 and/or 53.

FIG. 14*a* to FIG. 14*d* show components for carrying out the method of FIG. 1 and illustrate, by four exemplary alternatives, that these components can be integrated into a single device or distributed over several devices.

Figure 14A:
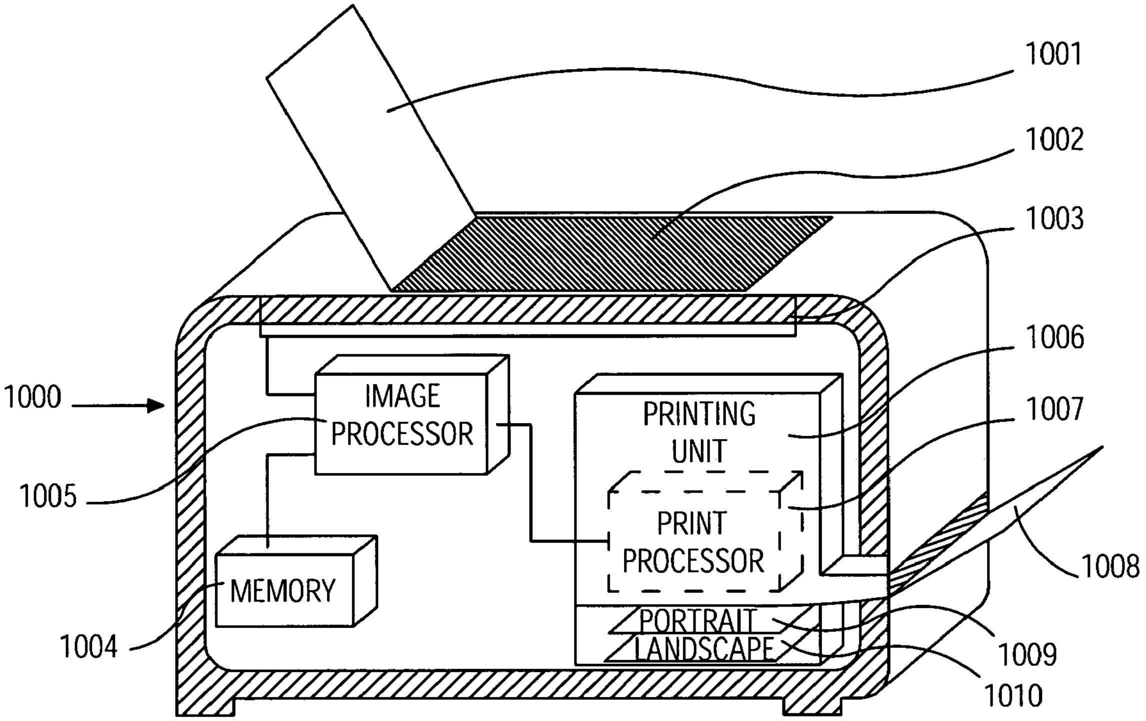
FIGS. 14*a*-*d* show components for carrying out the method of FIG. 1 and illustrate, by exemplary alternatives, that these components can be integrated into a single device or distributed over several devices.

FIG. 14*a* illustrates a copier 1000, which is, e.g., an ink-jet color copier. It has a scanning part 1003 with a scan bed 1002 which can be covered by a scan lid 1001. The scanning part 1003 is able to scan colored images printed on a printing media, e.g. a paper sheet, and to generate a digital representation of the original printed image, the bitmap-input image.

In order to be able to reproduce images already existing in a digital representation, the copier 103 may also have a memory 1004 for storing digital images. An image processor 1005 is arranged to receive the bitmap-input images to be reproduced, either from the scanning part 1003 or the memory 1004. It processes these images, for example by transforming near-primary colors (and near-black) to primary colors (and black) and/or adds tags relating to color snapping, spatial resolution and/or print direction, as explained above. A printing unit 1006 including a print processor 1007 is arranged to produce the print out of the image from the image processor 1005 on a print media, e.g. a paper sheet 1008. The printer 1006 may have two paper trays 1009 and 1010, as shown in FIG. 14*a*. The print processor 1007 follows the instructions represented by the tags, e.g. causes the use of a primary color or black instead of the color represented in the bitmap, causes the use of a high-resolution print mask for tagged pixel regions and/or causes a page to be printed in the direction perpendicular to the main reading direction, according to the printing-direction tag, and finally produces a map representing the amounts of ink of the different available colors to be applied to the different raster points on the print media 1008. Ink-jet print heads comprised in the printing unit 1006 finally apply the inks according to this and produce the final print-out on the paper sheet 1008.

The copier 1003 has two paper trays, 1009 and 1010; for example, paper tray 1009 contains paper in portrait orientation, and paper tray 1010 contains paper in landscape orientation. The print processor 1007 is also coupled with a paper-tray-selection mechanism such that, depending on the printing-direction tag, pages to be printed in portrait orientation are printed on portrait-oriented paper, and pages to be printed in landscape orientation are printed on landscape-oriented paper.

In the embodiment of FIG. 14*a*, the image processor 1005 and the print processor 1007 are shown to be distinct processors; in-other embodiments, the tasks of these processors are performed by a combined image and print processor.

Figure 14B:
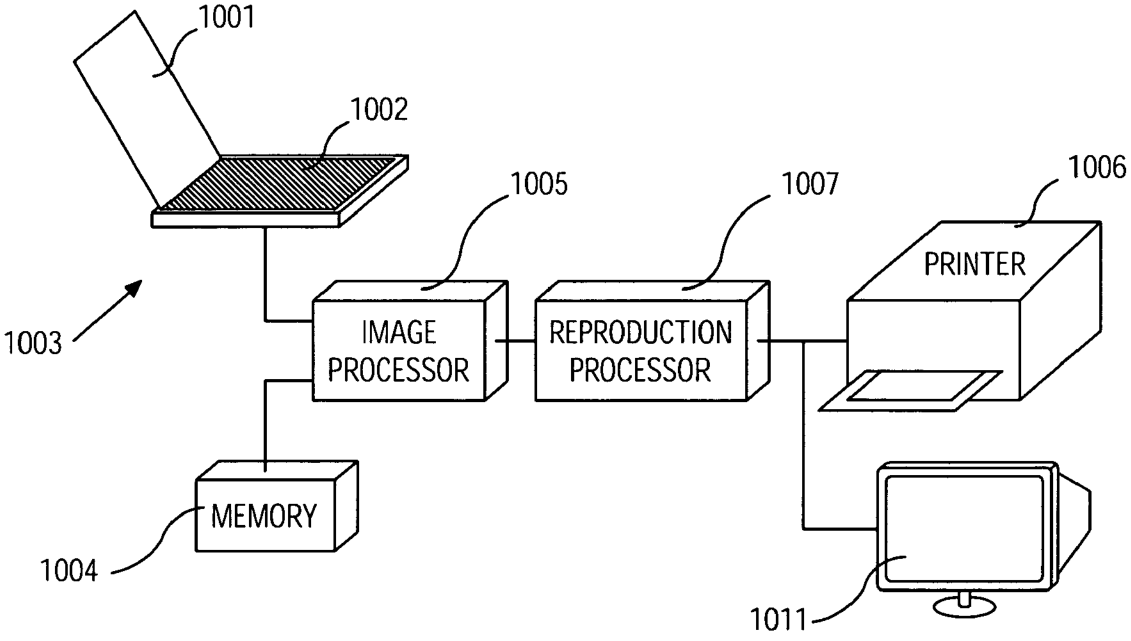

FIG. 14*b* shows an alternative embodiment having the same functional units 1001-1007 of the copier 1000 of FIG. 14*a*; however, these units are not integrated in one and the same device. Rather, a separate scanner 1003 and a separate printer 1006 are provided. The data processing and data storing units, i.e. the memory 1004, the image processor 1005 and the print processor 1007 (here called "reproduction processor") may be part of a separate special-purpose or multi-purpose computer, or may be integrated in the scanner 1003 and/or the printer 1006.

FIG. 14*b* also shows another reproducing device, a display screen 1011. The display screen 1011 may replace, or may be used in addition to, the printer 1006. When the screen 1011 is used to reproduce the images, typically no print-direction tagging is applied.

Figure 14C:
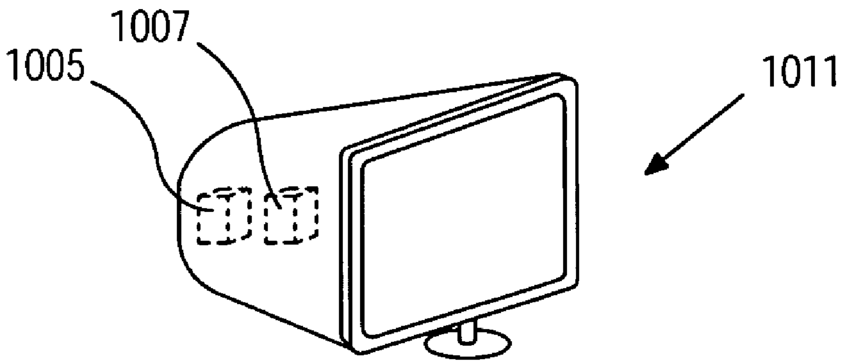
Figure 14D:
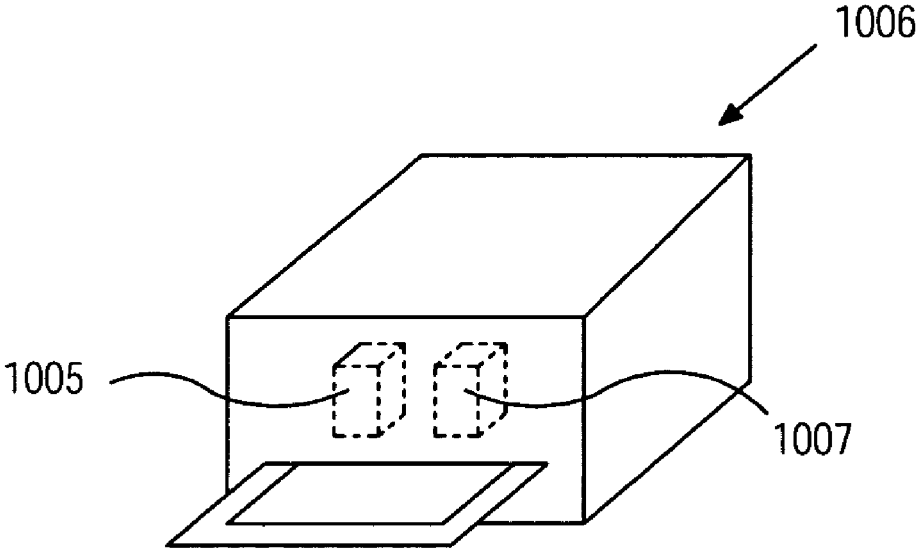

FIGS. 14*c* and 14*d* illustrate embodiments of a display screen (FIG. 14*c*) and a printer (FIG. 14*d*) in which the image processor 1005 and the reproduction processor 1006 are integrated in the display screen 1011 and the printer 1006, respectively. Consequently, such screens and printers perform the described image-quality improvements in a stand-alone manner and can therefore be coupled to usual image-data sources, such as a usual multi-purpose computer, which need not be specifically arranged to provide, or even have awareness of, the image-quality-improving measures applied.

Figure 15:
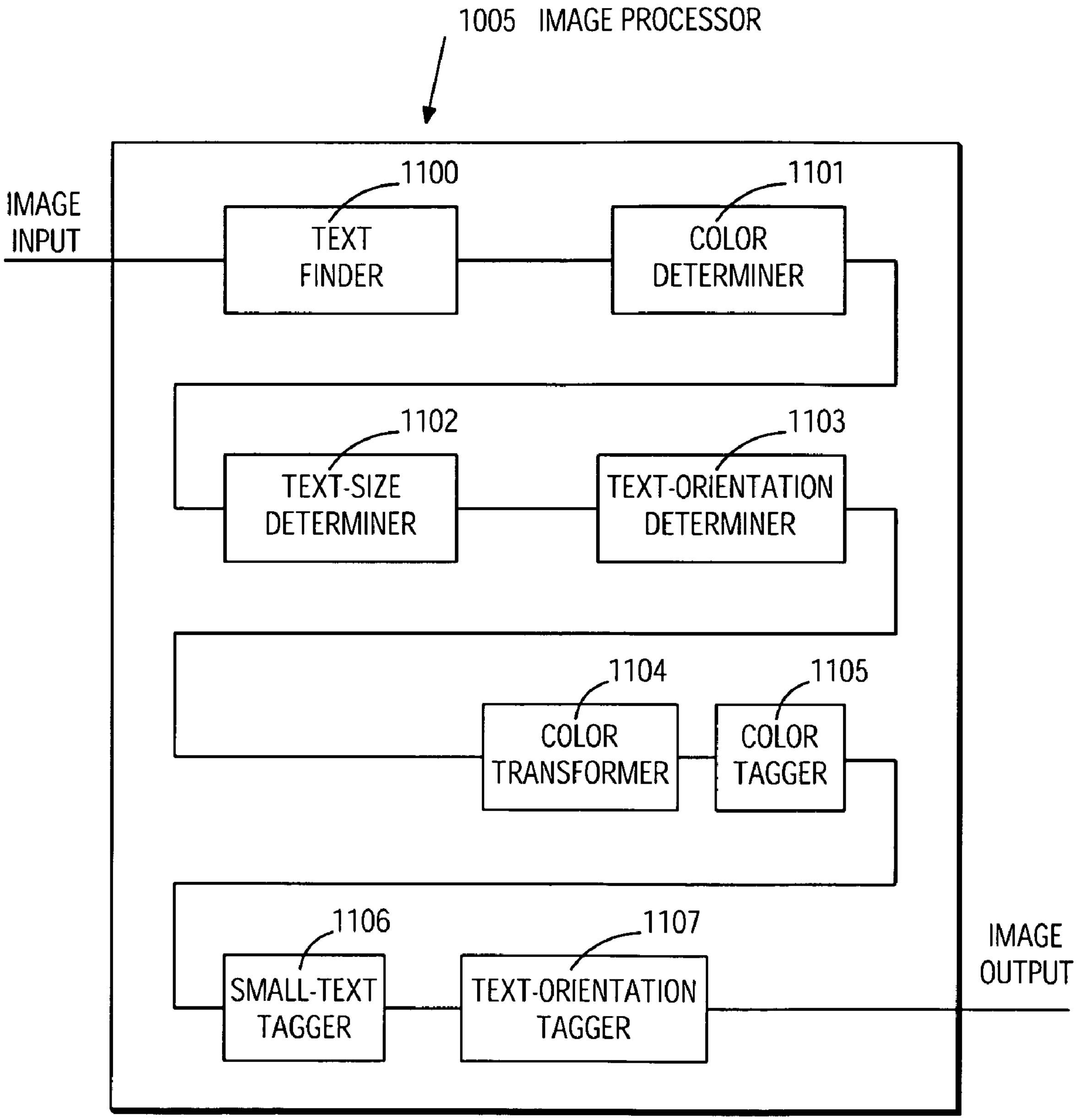
FIG. 15 is a high-level functional diagram of an image processor.
Figure 16:
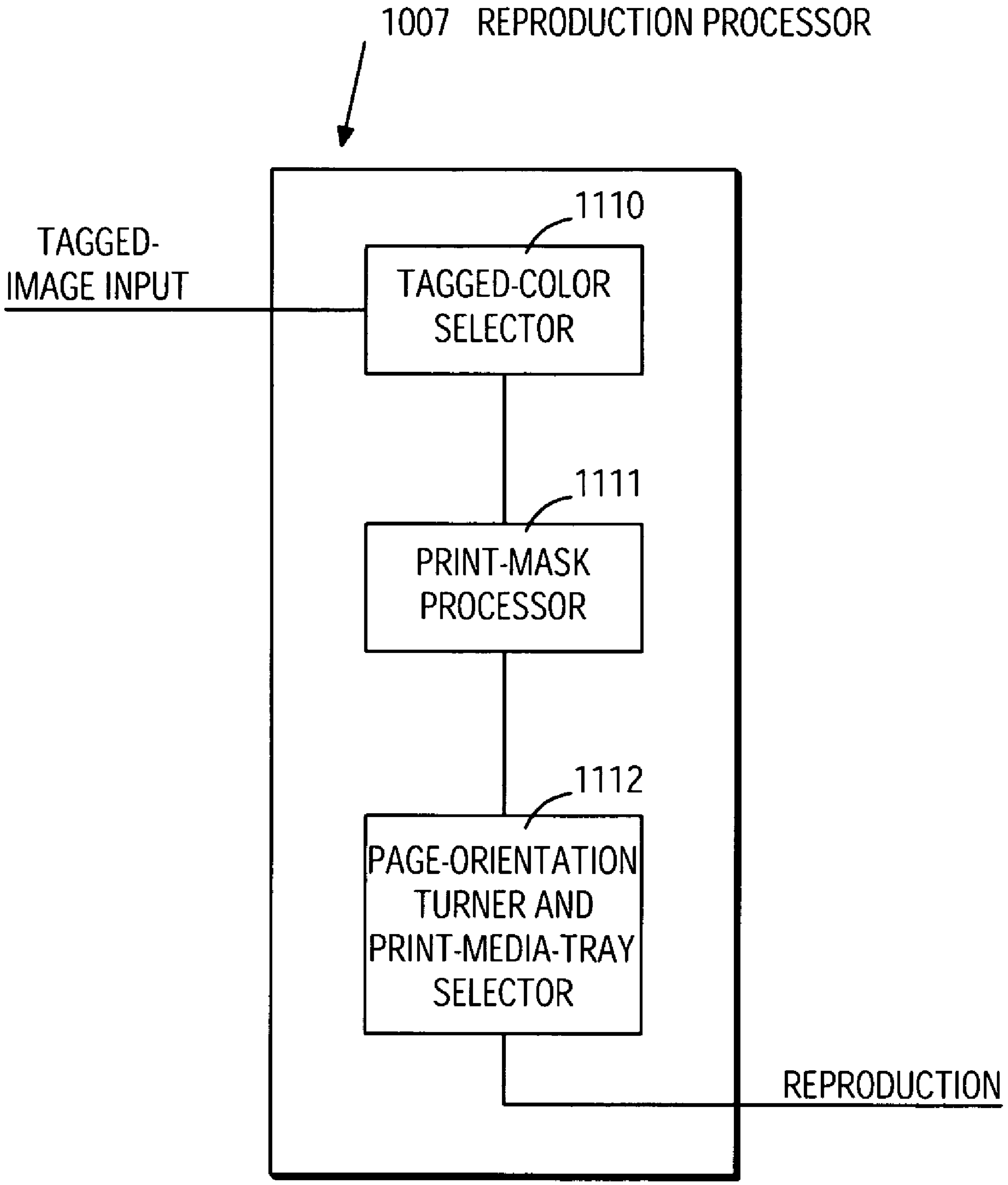
FIG. 16 is a high-level functional diagram of a reproduction processor.

FIGS. 15 and 16 are high-level functional diagrams of the image processor 1005 and the reproduction or print processor 1007 of FIG. 14. According to the representations of FIGS. 15 and 16, the image processor 1005 and the reproduction processor 1007 are subdivided into several components. However, it should be noted that this subdivision is only functional and does not necessarily imply a corresponding structural division. Typically, the functional components shown represent functionalities of one or more computer programs which do not necessarily have a component structure, as the one shown in FIGS. 15 and 16. The functional components shown can, of course, be merged with other functional components or can be made of several distinct functional sub-components.

According to FIG. 15, the image processor 1005 has an input to receive bitmap-input images and an output to supply transformed and/or tagged bitmap images to downstream reproduction processor 1007. A text finder 1100 is arranged to identify text zones within the bitmap-input image, by means of a zoning-analysis algorithm. A color determiner 1101 is arranged to determine, for each text item (e.g. character) in the text zones found, the average color of the pixels belonging to the text item. In some embodiments, the definition of which pixels belong to a text item is based on OCR. Based on the average color found, the color determiner 1001 is further arranged to determine whether the pixels of a character are close to a primary color or black so as to be snapped to the primary color or black. A text-size determiner 1102 is arranged to determine the sizes of the text items (e.g. characters) in the text zones, for example based on OCR. A text-orientation determiner 1103 is arranged to determine the orientations of the individual text items (e.g. characters) in the text zones for a page, and, based on that, to determine the main text orientation and main reading direction. A color transformer 1104 is arranged, based on the results obtained by the color determiner 1101, to transform, in the input-bitmap image, the color of pixels of characters to be snapped to the respective primary color or black. Alternatively, a color tagger 1105 is provided; it is arranged, based on the results obtained by the color determiner 1101, to tag the pixels of characters to be snapped so as to indicate that these pixels are to be reproduced in the respective primary color or black. A small-text tagger 1106 is arranged, based on the results obtained by the text-size determiner 1102, to tag pixels or pixel regions of small characters so as to indicate that these pixels, or pixel regions, are to be reproduced with a higher spatial resolution. Finally, a text-orientation tagger 1107 is arranged, based on the determined main-reading directions of the individual pages, to tag the pages so as to indicate whether they are to be printed in portrait or landscape format, so as to assure that the print direction for each page is perpendicular to the page's main reading direction.

According to FIG. 16, the reproduction (or print) processor 1107 has an input to receive tagged images and an output to directly control the image reproduction, e.g. to direct the print head of an ink-jet printing device. A tagged-color selector 1110 is arranged to cause bitmaps in which certain bits or bit regions are color-tagged to be reproduced in the primary color, or black indicated by the color tag. A print-mask processor 1111 is arranged, on the basis of small-text tags assigned to the input image, to prepare a print mask which causes the tagged small-character regions to be reproduced with a higher spatial resolution than the other text regions. A page-orientation turner and print-media-tray selector 1112 is arranged, based on text-orientation tags associated with pages of the input image, to turn the image to be printed and select the appropriate print-media tray (i.e. either the portrait tray or the landscape tray) so as to assure that the print direction is perpendicular to the page's main reading direction.

The preferred embodiments enable images containing text to be reproduced with an improved text image quality and/or higher throughput.

All publications and existing systems mentioned in this specification are herein incorporated by reference.

Although certain methods and products constructed in accordance with the teachings of the invention have been described herein, the scope of coverage of this patent is not limited thereto. On the contrary, this patent covers all embodiments of the teachings of the invention fairly falling within the scope of the appended claims either literally or under the doctrine of equivalents.

What is claimed is:

1. A method of reproducing an image by an ink-jet printing device, comprising:

creating a, or using an a ready existing, bitmap-input image;

finding zones in the input image containing text;

determining (i) colors of pixels, characters, or larger text items in the text zones, (ii) sizes of the characters or larger text items, (iii) a main orientation of the text in the input image;

printing the image, wherein (i) pixels, characters or larger text items with a color near to a basic color are reproduced in the basic color, (ii) smaller text is reproduced with a higher spatial resolution than larger text, (iii) the image is printed in a print direction transverse to a main reading direction of the text, based on the main text orientation determined.

2. The method of claim 1, wherein the input image is created by scanning or capturing a physical image and producing a bitmap representation of it, or by converting an image represented by structured data into the bitmap-input image.

3. The method of claim 1, wherein determining and reproducing the color of characters or larger text items comprises:

recognizing characters by optical character recognition;

averaging the colors of the pixels associated with recognized characters or larger text items;

reproducing the characters or larger text items, when the average color of a character or larger text item is near to a basic color, in the basic color.

4. The method of claim 1, wherein the higher spatial resolution for smaller text is achieved by using a higher-resolution-print mask for the smaller text.

5. The method of claim 1, wherein, for the printing process, a page orientation is chosen such that the print direction is transverse to the main reading direction of the text.

6. The method of claim 1, wherein the color representation of pixels in the input image which are to be printed in a modified color, i.e. a basic color, is transformed into a representation of the basic color, and the image transformed in this way is then printed.

7. The method of claim 1, wherein pixels in the input image which are to be printed in a modified color, i.e. a basic color, are tagged, and wherein, during the printing process, the tagged pixels are printed in the modified color.

8. The method of claim 1, wherein pixels associated with characters or larger text items to be printed with a higher spatial resolution are tagged, and wherein, during the printing process, a higher spatial resolution is chosen for tagged pixels.

9. The method of claim 1, wherein pixels associated with text in text zones found are tagged, and wherein the way of printing pixels tagged as text pixels differs from that of other pixels by at least one of:

different halftone methods are applied, different spatial or color resolutions are used, different linearization methods are used, edges are treated in a different manner, text is underprinted with color to increase optical density.

10. A method of reproducing an image, comprising:

creating a, or using an already existing, bitmap-input image;

finding zones in the input image containing text;

determining colors of pixels, characters, or larger text items in the text zones;

reproducing the image, wherein pixels, characters or larger text items with a color near to a primary color are reproduced in the primary color.

11. A method of reproducing an image, comprising:

creating a, or using an already existing!bitmap-input image;

finding zones in the input image containing text;

determining colors of characters or larger text items in the text zones by recognizing characters by optical character recognition and averaging the colors of pixels associated with recognized characters or larger text items;

reproducing the image, wherein the characters or larger text items, when the average color of a character or larger text item is near to a basic color, are reproduced in the basic color.

12. A method of reproducing an image by an ink-jet printing device, comprising:

creating a, or using an already existing, bitmap-input image;

finding zones in the input image containing text;

determining a main orientation of the text in the zones found in the input image;

printing the image in a print direction transverse to a main reading direction of the text, based on the main text orientation determined.

13. An ink-jet printing device comprising:

a text finder arranged to find text zones in a bitmap-input image;

a color determiner arranged to determine colors of pixels, characters, or larger text items in the text zones;

a size determiner arranged to determine the size of the characters or larger text items;

an orientation determiner arranged to determine a main orientation of the text in the input image;

wherein the printing device is arranged to print the image such that (i) pixels, characters or larger text items with a color near to a basic color are reproduced in the basic color, (ii) smaller text is reproduced with a higher spatial resolution than larger text, (iii) the image is printed in a print direction transverse to a main reading direction of the text, based on the main text orientation determined.

14. The ink-jet printing device of claim 13, comprising a scanner or capturing device to obtain the bitmap-input image from a physical image.

15. The ink-jet printing device of claim 13, comprising an image-representation converter arranged to convert an image represented by structured data into the bitmap-input image.

16. The ink-jet printing device of claim 13, wherein the color determiner is arranged to recognize characters by optical character recognition, average the colors of the pixels associated with recognized characters or larger text items; and wherein the printing device is arranged to reproduce the characters or larger text items, when the average color of a character or larger text item is near to a basic color, in the basic color.

17. The ink-jet printing device of claim 13, arranged to use higher-resolution-print masks for smaller text to achieve the higher spatial resolution for the smaller text.

18. The ink-jet printing device of claim 13, comprising a page-orientation turner arranged to turn the page to be printed to an orientation in which the print direction is transverse to the main reading direction of the text.

19. The ink-jet printing device of claim 13, comprising a color transformer arranged to transform the color representation of pixels in the input image which are to be printed in a modified color, i.e. a basic color, into a representation of the basic color.

20. The ink-jet printing device of claim 13, comprising a color tagger arranged to tag pixels in the input image which are to be printed in a modified color, i.e. a basic color, wherein the printing device is arranged, during the printing process, to print the tagged pixels in the modified color.

21. The ink-jet printing device of claim 13, comprising a small-text tagger arranged to tag pixels associated with characters or larger text items to be printed with a higher spatial resolution, wherein the printing device is arranged, during the printing process, to choose a higher spatial resolution for tagged pixels.

22. The ink-jet printing device of claim 13, comprising a text tagger arranged to tag pixels associated with text in text zones found, wherein the printing device is arranged to print pixels tagged as text pixels in a way that differs from that of other pixels by at least one of:

different halftone methods, different spatial or color resolutions, different linearization methods, different edge-treatment, text underprint with color to increase optical density.

23. An image-reproduction device comprising:

a text finder arranged to find text zones in a bitmap-input image;

a color determiner arranged to determine colors of pixels, characters, or larger text items in the text zones;

wherein the image-reproduction device is arranged to reproduce the image such that pixels, characters or larger text items with a color near to a primary color are reproduced in the primary color.

24. An image-reproduction device comprising:

a text tinder arranged to find text zones in a bitmap-input image;

a color determiner arranged to determine colors of pixels, characters, or larger text items in the text zones by optical character recognition and average the colors of pixels associated with recognized characters or larger text items;

wherein the image-reproduction device is arranged to reproduce the image such that the characters or larger text items, when the average color of a character or larger text item is near to a basic color, in the basic color.

25. An ink-jet printing device comprising:

a text finder arranged to find text zones in a bitmap-input image;

an orientation determiner arranged to determine a main orientation of the text In the Input image;

wherein the printing device is arranged to print the image in a print direction transverse to a main reading direction of the text, based on the main text orientation determined.

* * * * *

UNITED STATES PATENT AND TRADEMARK OFFICE

CERTIFICATE OF CORRECTION

PATENT NO. : 7,450,268 B2
APPLICATION NO. : 10/884516
DATED : November 11, 2008
INVENTOR(S) : Oscar Martinez et al.

It is certified that error appears in the above-identified patent and that said Letters Patent is hereby corrected as shown below:

In column 21, line 13, in Claim 1, delete "a ready" and insert -- already --, therefor.

In column 22, line 11, in Claim 11, delete "existing!bitmap-input" and insert -- existing, bitmap-input --, therefor.

In column 24, line 11, in Claim 24, delete "tinder" and insert -- finder --, therefor.

In column 24, line 27, in Claim 25, delete "In the Input" and insert -- in the input --, therefor.

Signed and Sealed this
Twentieth Day of November, 2012

David J. Kappos

David J. Kappos
*Director of the United States Patent and Trademark Office*